United States Patent
Bulzacchelli et al.

(10) Patent No.: US 8,681,839 B2
(45) Date of Patent: Mar. 25, 2014

(54) CALIBRATION OF MULTIPLE PARALLEL DATA COMMUNICATIONS LINES FOR HIGH SKEW CONDITIONS

(75) Inventors: John F. Bulzacchelli, Yonkers, NY (US); Timothy O. Dickson, Danbury, CT (US); Frank D. Ferraiolo, Essex Junction, VT (US); Robert J. Reese, Austin, TX (US); Michael B. Spear, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 12/912,883

(22) Filed: Oct. 27, 2010

(65) Prior Publication Data

US 2012/0106687 A1 May 3, 2012

(51) Int. Cl.
*H04B 1/38* (2006.01)
*H04L 5/16* (2006.01)

(52) U.S. Cl.
USPC .......................................... 375/220

(58) Field of Classification Search
None
See application file for complete search history.

(56) References Cited

U.S. PATENT DOCUMENTS

| | | | |
|---|---|---|---|
| 4,656,592 A | 4/1987 | Spaanenburg et al. | |
| 4,964,120 A | 10/1990 | Mostashari | |
| 5,734,844 A | 3/1998 | Moughanni et al. | |
| 6,240,087 B1 | 5/2001 | Cummings et al. | |
| 6,606,576 B2 * | 8/2003 | Sessions | 702/107 |
| 6,650,649 B1 | 11/2003 | Muhammad et al. | |
| 6,735,543 B2 | 5/2004 | Douskey et al. | |
| 6,771,568 B2 | 8/2004 | Hochendoner | |
| 7,072,355 B2 | 7/2006 | Kizer | |
| 7,117,126 B2 | 10/2006 | Floyd et al. | |
| 7,305,574 B2 | 12/2007 | Ferraiolo et al. | |
| 7,444,559 B2 | 10/2008 | Swanson et al. | |
| 7,676,715 B2 | 3/2010 | Miller et al. | |
| 2002/0093994 A1 * | 7/2002 | Hendrickson et al. | 370/536 |
| 2002/0145981 A1 | 10/2002 | Klinker et al. | |
| 2005/0213593 A1 | 9/2005 | Anderson et al. | |

(Continued)

FOREIGN PATENT DOCUMENTS

| | | |
|---|---|---|
| JP | 9161498 A | 6/1997 |
| JP | 2000090690 A | 3/2000 |

OTHER PUBLICATIONS

"Continuous Time, Interface Calibration for a High-Speed Interface—Dynamic Data Centering", published anonymously in ip.com, Document No. IPCOM000196832D, Jun. 17, 2010.

(Continued)

*Primary Examiner* — Chieh M Fan
*Assistant Examiner* — Wednel Cadeau
(74) *Attorney, Agent, or Firm* — Roy W. Truelson

(57) ABSTRACT

A parallel data link includes a redundant line. A bank of switches permits any arbitrary line of the link to be enabled or disabled for carrying functional data, each line being dynamically calibrated in turn by disabling the line and allowing other lines to carry the functional data. The switches are located downstream of alignment mechanisms so that data input to the switches is compensated for data skew. Preferably, receiver synchronization circuitry in each line operates in a respective independent clock domain, while the switches and calibration mechanism operate in a common clock domain. Preferably, the receiver synchronization circuits provide an adjustable delay corresponding to a variable number of clock cycles to align the outputs of the receiver synchronization circuits with respect to one another, which can accommodate high data skew.

22 Claims, 13 Drawing Sheets

(56) References Cited

U.S. PATENT DOCUMENTS

| | | |
|---|---|---|
| 2005/0216736 A1 | 9/2005 | Smith |
| 2006/0159113 A1* | 7/2006 | Kizer ............................ 370/419 |
| 2007/0002939 A1 | 1/2007 | Daugherty |
| 2007/0177576 A1 | 8/2007 | Johansen et al. |
| 2007/0183319 A1 | 8/2007 | Rug et al. |
| 2008/0320191 A1 | 12/2008 | Bravo et al. |
| 2010/0005202 A1 | 1/2010 | Ferraiolo et al. |
| 2010/0005365 A1 | 1/2010 | Buchmann et al. |
| 2010/0121994 A1 | 5/2010 | Kim et al. |
| 2010/0174955 A1 | 7/2010 | Carnevale et al. |
| 2010/0265820 A1 | 10/2010 | Feng et al. |
| 2011/0320881 A1 | 12/2011 | Dodson et al. |
| 2011/0320921 A1 | 12/2011 | Gower et al. |
| 2012/0106539 A1 | 5/2012 | Ferraiolo et al. |
| 2012/0155253 A1 | 6/2012 | Johansen |

OTHER PUBLICATIONS

"Continuous Time, Interface Calibration for a High-Speed Interface—Decision Feedback Equalization (DFE)", published anonymously in ip.com, Document No. IPCOM000196836D, Jun. 17, 2010.

"Real Time, Interface Calibration for a High-Speed Interface—Continuous Time Linear Equalization (CTLE)", published anonymously in ip.com, Document No. IPCOM000196834D, Jun. 17, 2010.

"Continuous Time, Interface Calibration for a High-Speed Interface—DC Offset Calibration", published anonymously in ip.com, Document No. IPCOM000196833D, Jun. 17, 2010.

"Continuous Time, Interface Calibration for a High-Speed Interface—VGA Gain Adjust", published anonymously in ip.com, Document No. IPCOM000196835D, Jun. 17, 2010.

D. M. Berger et al., "High-speed source-synchronous interface for the IBM System z9 processor", IBM J. Res. & Dev., vol. 51, No. 1/2, Jan./Mar. 2007.

"Failing Bus Lane Detection Using Syndrome Analysis", U.S. Appl. No. 12/822,498, filed Jun. 24, 2010.

"Isolation of Faulty Links in a Transmission Medium", U.S. Appl. No. 12/822,508, filed Jun. 24, 2010.

* cited by examiner

CALIBRATION OF MULTIPLE PARALLEL DATA COMMUNICATIONS LINES FOR HIGH SKEW CONDITIONS

CROSS REFERENCE TO RELATED APPLICATION

The present application is related to commonly assigned copending U.S. patent application Ser. No. 12/913,064, filed the same day as the present application, entitled "Coordinating Communications Interface Activities in Data Communicating Devices Using Redundant Lines", which is herein incorporated by reference.

FIELD OF THE INVENTION

The present invention relates to digital data processing, and in particular to the design and operation of communications circuit interfaces for communicating between digital data devices.

BACKGROUND

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication links coupled to a network, etc. CPU's (also called processors) are capable of performing a limited set of very simple operations, but each operation is performed very quickly. Data is moved between processors and memory, and between input/output devices and processors or memory. Sophisticated software at multiple levels directs a computer to perform massive numbers of these simple operations, enabling the computer to perform complex tasks, and providing the illusion at a higher level that the computer is doing something sophisticated.

Continuing improvements to computer systems can take many forms, but the essential ingredient of progress in the data processing arts is increased throughput, i.e., performing more of these simple operations per unit of time.

The computer is a sequential state machine in which signals propagate through state storing elements synchronized with one or more clocks. Conceptually, the simplest possible throughput improvement is to increase the speeds at which these clocks operate, causing all actions to be performed correspondingly faster.

Data must often be communicated across boundaries between different system components. For example, data may need to be communicated from one integrated circuit chip to another. In countless instances, an operation to be performed by a component can not be completed until data is received from some other component. The capacity to transfer data can therefore be a significant limitation on the overall throughput of the computer system. As the various components of a computer system have become faster and handle larger volumes of data, it has become necessary to correspondingly increase the data transferring capability ("bandwidth") of the various communications paths.

Typically, a communications medium or "bus" for transferring data from one integrated circuit chip to another includes multiple parallel lines which carry data at a frequency corresponding to a bus clock signal, which may be generated by the transmitting chip, the receiving chip, or some third component. The multiple lines in parallel each carry a respective part of a logical data unit. For example, if eight lines carry data in parallel, a first line may carry a first bit of each successive 8-bit byte of data, a second line carry a second bit, and so forth. Thus, the signals from a single line in isolation are meaningless, and must somehow be combined with those of other lines to produce coherent data.

The increased clock frequencies of processors and other digital data components have induced designers to increase the speeds of bus clocks in order to prevent transmission buses from becoming a bottleneck to performance. This has caused various design changes to the buses themselves. For example, a high-speed bus is typically implemented as a point-to-point link containing multiple lines in parallel, each carrying data from a single transmitting chip to a single receiving chip, in order to support operation at higher bus clock speeds.

The geometry, design constraints, and manufacturing tolerances of integrated circuit chips and the circuit cards or other platforms on which they are mounted makes it impossible to guarantee that all lines of single link are identical. For example, it is sometimes necessary for a link to turn a corner, meaning that the lines on the outside edge of the corner will be physically longer than those on the inside edge. Circuitry on a circuit card is often arranged in layers; some lines may lie adjacent to different circuit structures in neighboring layers, which can affect stray capacitance in the lines. Any of numerous variations during manufacture may cause some lines to be narrower than others, closer to adjacent circuit layers, etc. These and other variations affect the time it takes a signal to propagate from the transmitting chip to the receiving chip, so that some data signals carried on some lines will arrive in the receiving chip before others (a phenomenon referred to as data skew). Furthermore, manufacturing variations in the transmitter driving circuitry in the transmitting chip or receiving circuitry in the receiving chip can affect the quality of the data signal.

Where bus clock speeds are relatively slow, data skew is not a significant concern. But as clock speeds increase, skew becomes relatively more significant. Eventually, the clock speeds become so fast that a first bit of a sequence transmitted on one line arrives at the same time as a succeeding bit of the same sequence transmitted on another line of the same link. In other words, the difference in transmission time is enough to equal the time between successive bits. Modern bus clocks can be expected to reach the point where skew can equal the time to transmit 10 or 20 successive bits. Moreover, skew is not constant. Skew and other variations in received signals can depend on operating temperature, supply voltages, and other dynamic factors.

Ideally, communications circuitry is tolerant of all these static and dynamic variations. With all these factors affecting the data signals transmitted on a transmission link, it is desirable to calibrate individual line circuitry to compensate for variations, and in particular, since critical parameters change over time, it is desirable to dynamically calibrate individual line circuitry while the digital data system is operating, i.e., while the link is available to transmit functional data.

One known technique for dynamic calibration involves the use of duplicate sets of certain receiver circuitry for each line of multiple parallel lines. In particular, adjustable analog circuits such as variable gain amplifiers, offset adders, and comparators may be duplicated for each line. The input analog signal is provided to both sets of receiver circuitry, allowing one set to be used for processing an incoming functional data signal and passing data through to registers or buffers which record the data, while the other set is being calibrated. While this approach enables dynamic calibration, it requires full duplication of considerable analog circuitry, significantly increasing the power consumption and the complexity of the device.

An alternative technique, disclosed in U.S. Pat. No. 6,606,576 to Sessions and in U.S. Pat. No. 7,072,355 to Kizer, is the use of a single additional redundant parallel line and associated receiver circuitry. A set of switches selects one line at a time for calibration, while the other lines are used to transmit functional data. This technique has certain limitations, not necessarily recognized, in its ability to handle large data skew, and specifically skew beyond a single bit time, the time required to transmit a single bit over a line. When a switch is made to enable one line for transmitting functional data and disable another line so it can be calibrated, it is desirable to do so without halting the link. However, if substantial data skew exists between the two lines being switched, there could be discontinuity at the output of the switch.

Conventional parallel interface designs either fail to adequately account for large data skew or other variations, or do so at the expense of substantial circuit complexity which can increase cost and/or power consumption at the interface, or require some interruption in data flow across the link. In order to support continuing increases in communications bus speeds, a need exists for improved communications circuitry which is tolerant of larger data skew without undue circuit complexity or interruption of function.

SUMMARY

A communications mechanism for communicating digital data between two devices includes multiple parallel lines, at least one of which is redundant. A bank of switches permits any arbitrary physical line to be enabled for carrying functional data or disabled. Respective circuitry associated with each line is calibrated by disabling the line, each line being selected for calibration in turn. The switches are located downstream of alignment mechanisms so that data input to the switches is compensated for data skew.

In a first inventive aspect, a respective receiver synchronization circuit receives a respective incoming signal from each line. Each incoming signal is synchronized to a respective clock domain associated with the corresponding line. The receiver synchronization circuits each receive the input signal in the respective clock domain associated with the corresponding line, and produce an output synchronized to a common clock domain. The switches within the receiver which enable or disable lines select outputs in this common clock domain. A calibration mechanism operates in the common clock domain and controls the switches. The calibration mechanism receives data in the common clock domain derived from outputs of said synchronization circuits to calibrate said synchronization circuits.

In a second inventive aspect, a respective sampler/deserializer circuit receives a respective incoming signal from each line and produces a respective deserialized output. A respective alignments circuit corresponding to each sampler deserializer circuit produces respective aligned data from the deserialized output. The switches within the receiver which enable or disable lines select data derived from the aligned data output of the alignment circuits. A calibration mechanism controls the switches. The calibration mechanism receives data derived from the aligned data output of the alignment circuits to calibrate the sampler/deserializer circuits.

In a third inventive aspect, a respective receiver synchronization circuit receives a respective incoming signal from each line. Each receiver synchronization circuit contains multiple deskewing latches for providing an adjustable delay corresponding to a variable number of cycles of a clock to align the outputs of the receiver synchronization circuits with respect to one another, the adjustable delay of each said receiver synchronization circuit being independently calibrated. A calibration mechanism controls the switches, and receives data derived from outputs of the receiver synchronization circuits to calibrate the receiver synchronization circuits.

A communications interface in accordance with the preferred embodiment can be dynamically calibrated without any interruption of function, and can accommodate a considerable amount of data skew among different lines while economizing the extent and power consumption of input circuitry, particularly high-power analog devices. Line delay for purposes of aligning data among different lines is preferably accomplished using a set of FIFO deskew buffers, in which data can be delayed a variable number of clock cycles through a series of latches. Switches which enable and disable receiver circuit outputs are preferably downstream of this FIFO deskew buffer in the host clock domain, providing isolation of the switches from both static and dynamic timing differences at the receiver inputs, and aligning large data skews before input to the switches. Finally, a calibration circuit preferably operates in the host clock domain using circuit output downstream of the FIFO deskew buffer, i.e. previously aligned digital data. The FIFO deskew buffer, switches and calibration circuit are preferably relatively low power digital logic devices in the host clock domain. The communications interface of the preferred embodiment therefore substantially reduces power consumption in an interface supporting continuous time, dynamic calibration of individual data lines.

The details of the present invention, both as to its structure and operation, can best be understood in reference to the accompanying drawings, in which like reference numerals refer to like parts, and in which:

DETAILED DESCRIPTION

Communications Media Terminology

Figure 1:
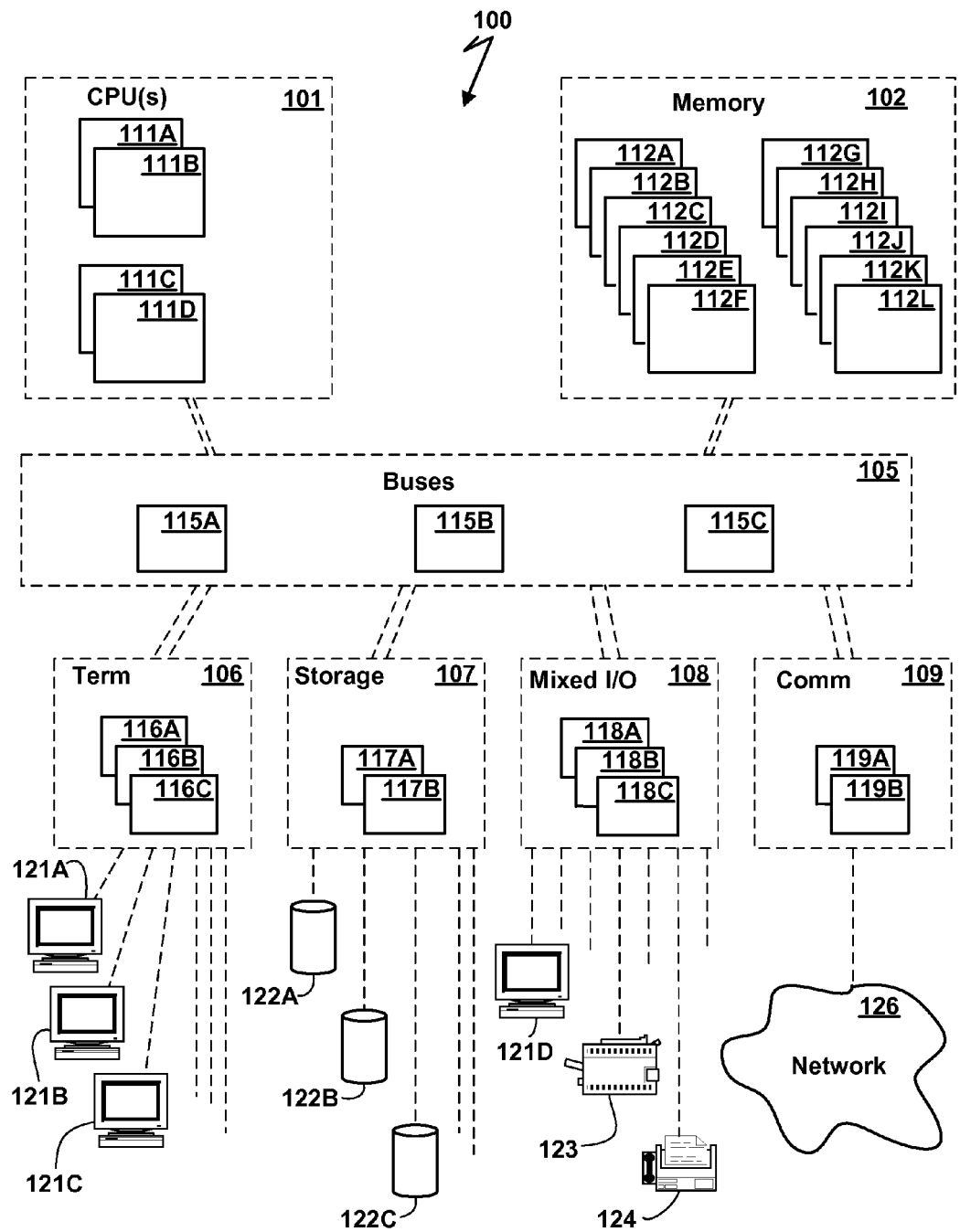
FIG. 1 is a high-level block diagram of the major hardware components of an exemplary computer system having multiple integrated circuit chips and one or more high-speed buses providing communications paths among the integrated circuit chips, according to the preferred embodiment.

As described herein, a digital communications media contains multiple lines in parallel which collectively transmit logical units of data from a transmitter to a receiver.

As used herein, a "line" is a communications medium which conveys a single bit of digital data at a time from a transmitter to one or more receivers. Commonly, a line is a single electrically conductive wire which transmits an electrical voltage, the value of the voltage with respect to a reference (such as ground) indicating the value of the bit of data. However, a "line" as used herein could also mean a pair of electrically conductive wires which each transmit a respective voltage, the relative values of the two voltages indicating the value of the bit of data. A line may be bidirectional, having both transmitting and receiving circuitry at either end, or may be unidirectional, having only transmitting circuitry at one end and only receiving circuitry at the other.

As used herein, "parallel lines" or a "parallel bus" refers to a set of multiple lines as explained above, wherein the lines of the set collectively are used to convey coherent data. Each line of the set only conveys some part of the data, which itself is only a meaningless stream of bits until it is combined and interleaved with the bits from the other lines to produce coherent data. In some parallel bus implementations, the bits of a logical unit of data are simultaneously presented at the receiver on a common clock signal. For example, if an 8-line parallel bus carries one byte of data at a time, all bits of that byte may be clocked into the receiver circuits simultaneously. However, this restriction is difficult or impossible to maintain as bus clock speeds increase due to the relative amount of data skew. Accordingly, in modern high-speed parallel buses, each of the lines may present data at the receiver at different phases and be sampled independently by their respective receiver circuits. Sometimes this latter form of parallel bus is referred to as a "striped serial bus", to distinguish it from slower buses which sample on a common clock. Unless otherwise qualified, a "parallel bus" or "parallel lines" as used herein does not imply any particular clock arrangement, and could be of the common clock phase type or of the independent clock phase type.

In the preferred embodiments described herein, a high-speed parallel bus is a point-to-point link, in which data is communicated only between a pair of devices, i.e. from one transmitter to one receiver. However, the present invention is not necessarily limited to use in point-to-point links, and unless otherwise qualified herein, the terms "parallel bus" or "parallel lines" should not be taken to require that the bus or lines be a point-to-point link. For example, a parallel bus could be a single-to-multi-point medium, in which there is a single transmitting device and multiple receiving devices, or a medium having multiple possible transmitting devices, which typically requires some form of arbitration.

One of the features of the communications mechanism described herein is the ability to calibrate certain circuitry while communicating functional data. As used herein, functional data means data used by the receiving chip, or by some other system component to which it is subsequently communicated, to perform its intended function (as opposed to test or calibration data used to test or calibrate the communications link itself, or control information used to control or coordinate the communications link, and specifically its calibration activities). The ability to calibrate certain communications circuitry while communicating functional data is referred to as continuous time, dynamic calibration.

Hardware Overview

In the preferred embodiment, multiple integrated circuit chips of a digital data system are coupled for inter-chip communications by one or more high-speed point-to-point data links or buses, each containing multiple parallel data lines. Referring to the Drawing, wherein like numbers denote like parts throughout the several views, FIG. 1 is a high-level high-level block diagram of the major hardware components of an exemplary general-purpose computer system having multiple integrated circuit chips and one or more high-speed buses providing communications paths among the integrated circuit chips, according to the preferred embodiment. At a functional level, the major components of system 200 are shown in FIG. 1 outlined in dashed lines; these components include one or more central processing units (CPUs) 101, main memory 102, interfaces for I/O devices such as terminal interface 106, storage interface 107, mixed I/O device interface 108, and communications/network interface 109, all of which are coupled for inter-component communication via one or more buses 105.

CPU 101 is one or more general-purpose programmable processors, executing instructions stored in memory 102; system 100 may contain either a single CPU or multiple CPUs, either alternative being collectively represented by feature CPU 101 in FIG. 1, and may include one or more levels of on-board cache (not shown). Memory 102 is a random-access semiconductor memory for storing data and programs. Memory 102 is conceptually a single monolithic entity, it being understood that memory is often arranged in a hierarchy of caches and other memory devices. Additionally, memory 102 may be divided into portions associated with particular CPUs or sets of CPUs and particular buses, as in any of various so-called non-uniform memory access (NUMA) computer system architectures.

Terminal interface 106 provides a connection for the attachment of one or more user terminals 121A-C (referred to generally as 121), and may be implemented in a variety of ways. Many large server computer systems (mainframes) support the direct attachment of multiple terminals through terminal interface I/O processors, usually on one or more electronic circuit cards. Alternatively, interface 106 may provide a connection to a local area network to which terminals 121 are attached. Various other alternatives are possible. Data storage interface 107 provides an interface to one or more data storage devices 122A-C, (referred to generally as 122), which are typically rotating magnetic hard disk drive units, although other types of data storage device could be used. Mixed I/O device interface 108 provides an interface to these or any of various other input/output devices or devices of other types. Three such devices, terminal 121D, printer 123 and fax machine 124, are shown in the exemplary embodiment of FIG. 1, it being understood that many other such devices may exist, which may be of differing types. Communications interface 109 provides one or more communications paths from system 100 to other digital devices and computer systems; such paths may include, e.g., one or more networks 126 such as the Internet, local area networks, or other networks, or may include remote device communication lines, wireless connections, and so forth. The communications paths running between I/O device interfaces 106-109 and the devices or networks may be dedicated communication links or links which are shared (e.g., multi-drop buses), and may be generally referred to as I/O buses, whether single or multiple devices are attached thereto.

Buses 105 provide communication paths among the various system components. Although a single conceptual bus entity 105 is represented in FIG. 1, it will be understood that a typical computer system may have multiple buses, often arranged in a complex topology, such as point-to-point links in hierarchical, star or web configurations, multiple hierarchical busses, parallel and redundant paths, etc., and that separate buses may exist for communicating certain information, such as addresses or status information.

Physically, the major functional units are typically embodied in one or more integrated circuit chips. Such chips are generally mounted on electronic circuit card assemblies, with multiple chips often mounted on a single circuit card. In FIG. 1, CPU 101 is represented as containing four integrated circuit chips 111A-D, each of which may contain one or more processors, or may perform only part of the functions of a single processor; memory 102 is represented as containing six chips 112A-112F, buses 105 as containing three bus interface chips 115A-C, terminal interface 106 as containing three chips 116A-116C, storage interface 107 as containing two chips 117A-B, I/O and mixed I/O device interface 108 as containing three chips 118A-C, and communications interface 109 as containing two chips 119A-B. However, the actual number of such chips may vary, and different devices as well as buses which couple multiple devices may be integrated into a single chip.

Figure 2:
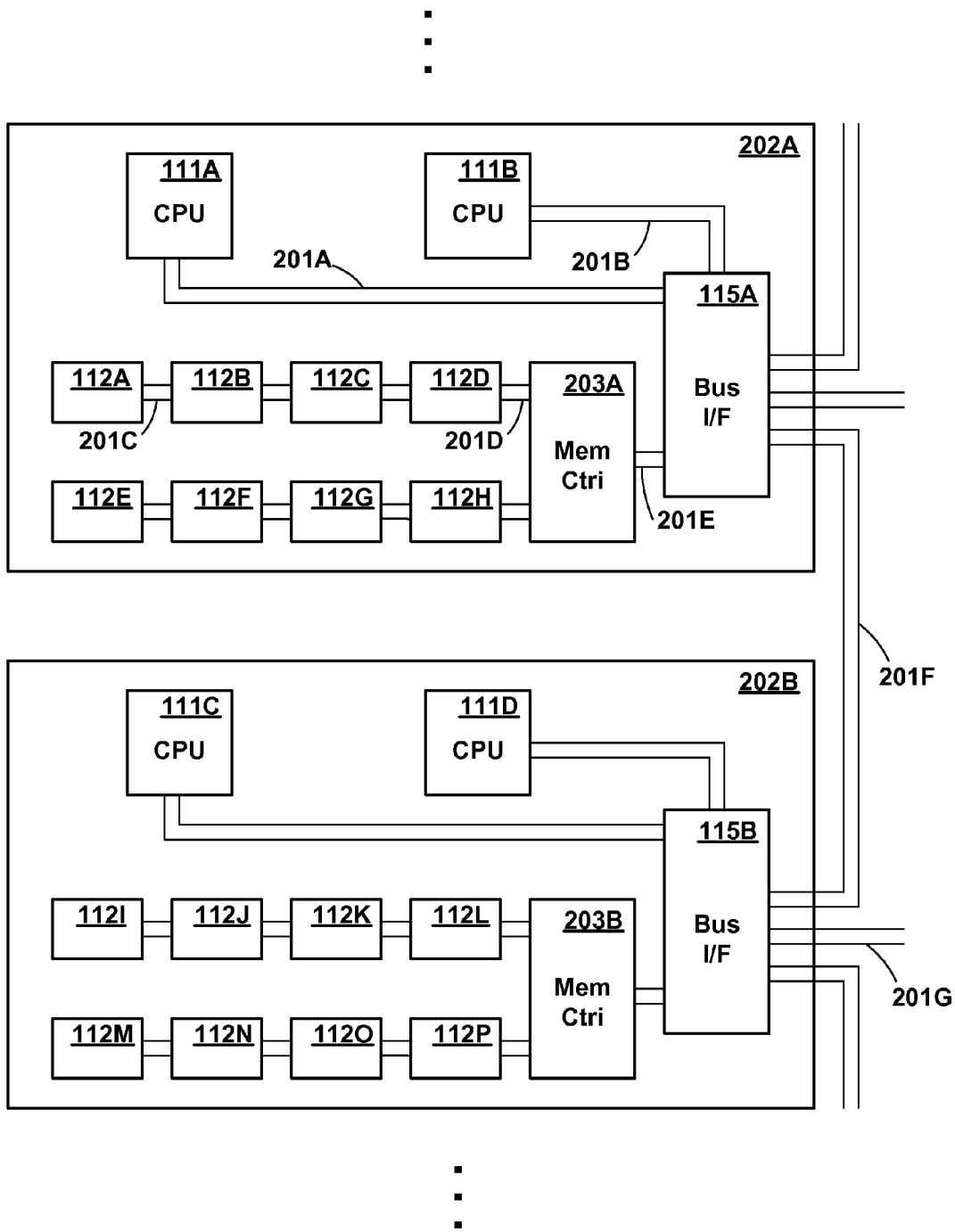
FIG. 2 is a generalized representation showing in greater detail certain hardware packaging elements of a representative portion of the computer system of FIG. 1, in accordance with the preferred embodiment.

Communication paths which connect the various components of system 100, and in particular paths connecting any of the various I/O devices with CPUs 101 or memory 102, are represented in FIG. 1 at a high level of abstraction. In fact, such paths are typically far more complex, and are generally arranged in a hierarchy. FIG. 2 is a generalized representation showing in greater detail certain hardware packaging elements of a representative portion of CPU 101, memory 102, and buses 105 for coupling CPU and memory of the computer system 100 of FIG. 1, in accordance with the preferred embodiment.

Referring to FIG. 2, multiple integrated circuit chips are each mounted on a respective circuit card 202A, 202B (herein generically referred to as feature 202), of which two are represented in FIG. 2, it being understood that the number of circuit cards may vary, and for a large computer system is typically much greater. For example, in the exemplary system portion of FIG. 2, circuit card 202A contains processor chips 111A, 111B, memory chips 112A-H, memory controller chip 203A for accessing memory chips 112A-H, and bus interface chip 115A. Circuit card 202B similarly contains processor chips 111C-D, memory chips 112I-P, memory controller chip 203B for accessing memory chips 112I-P, and bus interface chip 115B.

System 100 further contains multiple point-to-point communication links 201A-201G (herein generically referred to as feature 201), each coupling a respective pair of integrated circuit chips. Logically, these links convey data in both directions, but physically they are often constructed as a two separate sets of parallel lines, each set conveying data in a single direction opposite that of the other set. Some of these links couple pairs of integrated circuit chips mounted on the same circuit card, while other links couple pairs of chips mounted on different cards. For example, as shown in FIG. 2, links 201A, 201B couple processor chips 111A, 111B, respectively to bus interface chip 115A; link 201C couples memory chip 112A to memory chip 112B; link 201D couples memory chip 112D to memory controller chip 203A, and link 201E couples memory controller chip 203A to bus interface 115A, all of these chips being mounted on common circuit card 202A. There thus exists a communications path between any two chips on card 202A, although it may have to traverse one or more intermediate chips. Additionally, link 201F, connecting bus interface chip 115A with bus interface chip 115B, and link 201G, connecting bus interface chip 115B with another module (not shown), couple devices mounted on different circuit cards. Link 201G might couple chip 115B with a similar bus interface chip servicing additional processor and memory chips, or it might couple chip 115 with some other device, such as an I/O controller chip for connecting to one or more I/O buses. Although all of links 201A-G are logically point-to-point links, they do not necessarily have identical properties: they may operate at different clock speeds; they may have different widths (i.e., different numbers of parallel lines); they may operate at different voltages; some may contain bi-directional lines while others contain separate sets of uni-directional lines; and/or any of various additional parameters may be different.

It should be understood that FIGS. 1 and 2 are intended to depict the representative major components of system 100 at a high level, that individual components may have greater complexity than represented in FIGS. 1 and 2, that components other than or in addition to those shown in FIGS. 1 and 2 may be present, that the number, type and configuration of such components may vary, and that a large computer system will typically have more components than represented in FIGS. 1 and 2. Several particular examples of such additional complexity or additional variations are disclosed herein, it being understood that these are by way of example only and are not necessarily the only such variations.

Although system 100 is depicted as a multiple user system having multiple terminals, system 100 could alternatively be a single-user system, typically containing only a single user display and keyboard input, or might be a server or similar device which has little or no direct user interface, but receives requests from other computer systems (clients). While a large system typically contains multiple CPUs and multiple I/O buses, the present invention is not limited to use in systems of any particular size, and it would be possible to construct a system having only a single CPU and/or a single I/O bus. Furthermore, the present invention is not limited to use in general-purpose computer systems, but could be used in any digital data system having multiple integrated circuit chips which communicate with one another, whether called a computer system or not. By way of example and not limitation, such digital data systems could include control systems for machinery, entertainment systems, security and monitoring systems, medical systems, network routing mechanisms, telephonic and cell communications devices, personal digital devices, and so forth.

While FIG. 2 represents a system in which each card contains some processors and some memory, as might be typical of a non-uniform memory access (NUMA) or nodal computer system, all memory might alternatively be placed on one or more dedicated cards to which processors have uniform access. FIG. 2 further represents memory chips in a daisy-chain configuration of links from a controller, but numerous alternative chip configurations are possible. It will also be understood that other communications links which are not point-to-point links may be present; for example, I/O buses (not show in FIG. 2) often operate at slower speeds and may be embodied as multi-drop buses.

While various system components have been described and shown at a high level, it should be understood that a typical computer system contains many other components not shown, which are not essential to an understanding of the present invention.

Communications Circuit Description

Figure 3:
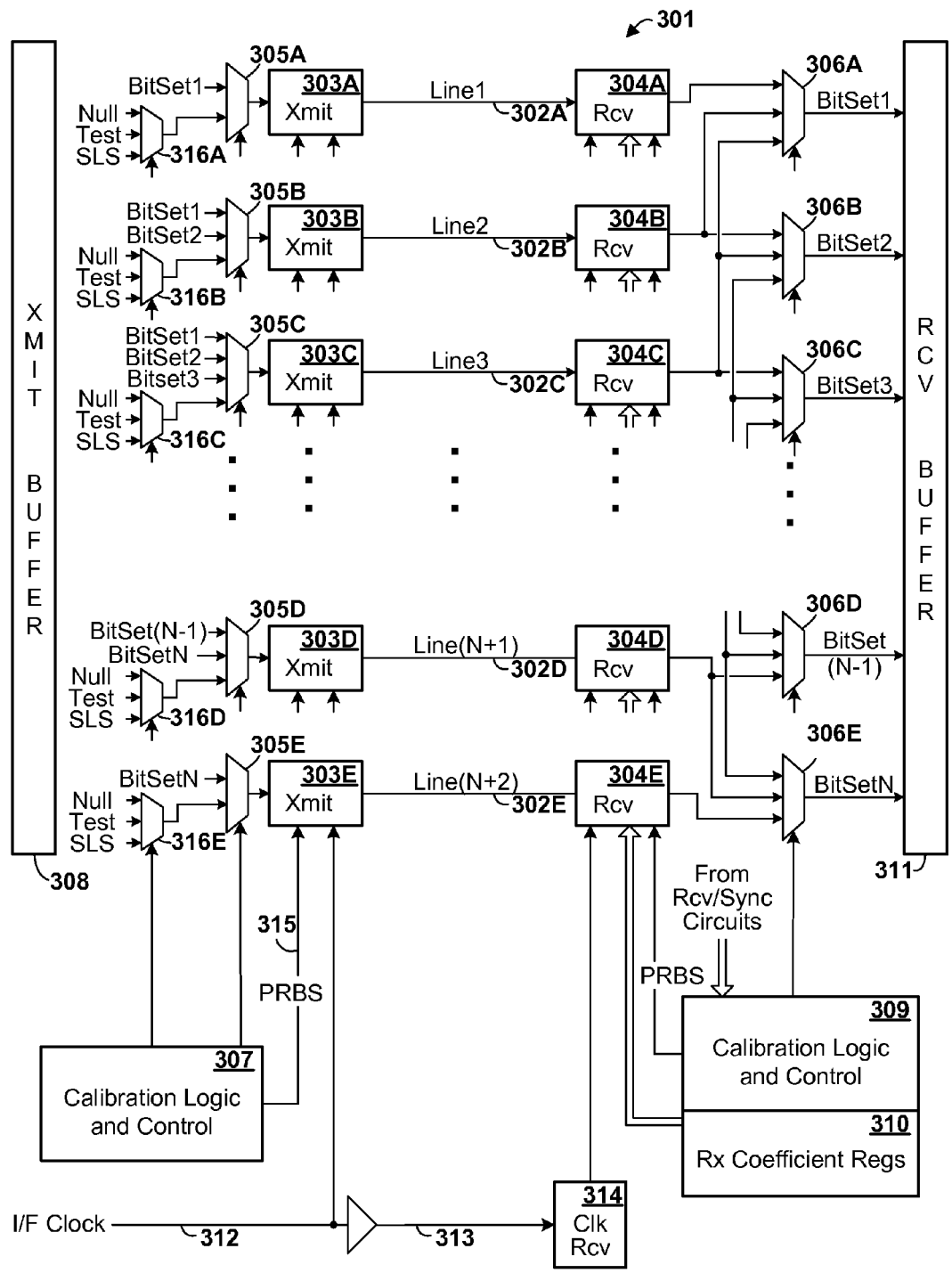
FIG. 3 is a diagram showing the basic structure of a unidirectional half of a single point-to-point link of parallel lines, according to the preferred embodiment.

FIG. 3 is a diagram showing the basic structure of a unidirectional half 301 of a single point-to-point link of parallel lines 201, according to the preferred embodiment. In this embodiment, each individual line is unidirectional, and a bidirectional link therefore comprises a set of unidirectional lines conveying data in one direction and another set of unidirectional lines conveying data in the opposite direction. FIG. 3 represents only one of these sets and associated circuitry in the transmitting and receiving chips, it being understood that the complete bidirectional link comprises a similar set of lines and associated circuitry for transmitting data in the opposite direction. These sets may each contain the same number of lines having the same parameters, or the number of lines and/or other parameters may be different. Furthermore, while it is preferred that separate sets of unidirectional lines be used, it would be alternatively possible to employ a single set of bidirectional lines, having both receiver and transmitter circuitry on each end.

Referring to FIG. 3, a unidirectional half 301 of a parallel link contains N parallel lines corresponding to an N-line wide data transmission capability, and M additional (redundant) parallel lines. These lines are represented as feature 302A-E, and herein generically referred to as feature 302. In the preferred embodiment, the link contains two redundant parallel lines (M=2), so that the total number of parallel lines is N+2. It is expected that M will be less than N and generally small; M might be only 1. At any given instant in time, only N of parallel lines 302 are used for transmitting functional data. The M redundant line or lines are used for dynamic calibration and/or as spares, as explained further herein. Since only N of the lines transmit functional data at a time, it can be said that the link contains N logical lines.

Unidirectional link half 301 further contains a respective transmitter drive circuit 303A-E (herein generically referred to as feature 303) in the transmitting chip corresponding to each parallel line 302; a respective receiver synchronization circuit 304A-E (herein generically referred to as feature 304) in the receiving chip corresponding to each parallel line 302; a respective transmitter selector switch 305A-E (herein generically referred to as feature 305) in the transmitting chip corresponding to each parallel line 302; a respective secondary input selector switch 316A-E (herein generically referred to as feature 316) in the transmitting chip corresponding to each parallel line 302; and a bank of N receiver selector switches 306A-E (herein generically referred to as feature 306) in the receiving chip, the number of switches 306 corresponding to the number of lines in the link.

On the transmitting chip, data for transmission across the link is placed in a transmit buffer 308. The buffer outputs N sets of bits in parallel, each set containing $P_{TX}$ bits, so that the buffer outputs a total of $N*P_{TX}$ bits in parallel. Each set of $P_{TX}$ bits is intended for transmission by a single line 302. A set may contain only a single bit ($PT_{TX}=1$), or may contain multiple bits. The use of multiple bits enables the transmit buffer (and by extension, the logic within the transmitting chip which supplies the transmit buffer) to operate at a lower frequency than the lines 302 of the link. In the preferred embodiment, $P_{TX}=4$, it being understood that this number may vary.

The output of the transmit buffer 308 is fed to transmitter selector switches 305. Each transmitter selector switch 305 corresponds to a single respective transmitter drive circuit 303 and line 302, there being N+2 transmitter selector switches in the preferred embodiment illustrated. Each transmitter selector switch 305 is also paired with a respective secondary input selector switch 316 which provides one of the inputs to the corresponding transmitter selector switch. Each transmitter selector switch receives multiple sets of $P_{TX}$ bits each as input and selects a single one of these sets as output to the corresponding transmitter drive circuit 303, according to a control signal received from calibration logic and control 307. The number of sets input to each selector depends on the position of the selector switch and the number of redundant lines in link half 301, and is a maximum of M+2. Thus, in the preferred embodiment in which M=2, the transmitter selector switches 305 for Line 1 and for Line (N+2) each have two input sets, consisting of bitset 1 and an input from the corresponding secondary input selector switch 316A (in the case of Line 1), or bitset N and an input from the corresponding secondary input selector switch 316E (in the case of Line (N+2)); the selector switches for Line 2 and for Line (N+1) each have three input sets, consisting of bitset 1, bitset 2, and an input from the corresponding secondary input selector switch 316B (in the case of Line 2), or bitset (N−1), bitset N, and an input from the corresponding secondary input selector switch 316D (in the case of Line (N+1); and the selector switches for all other lines each have a four set input, where the switch for the ith line (where 3<=i<=N) receives as input bitset (i−2), bitset (i−1), bitset(i), and a fourth input from the corresponding secondary input selector switch 316A.

Switches 305 make it possible to select any arbitrary N lines of the N+2 lines for transmitting data in transmit buffer 308 across the link. Or put another way, any arbitrary two of the N lines can be disabled or used for test or calibration purposes (by selecting the corresponding secondary input selector switch input) while the remaining lines are sufficient to transmit functional data in transmit buffer 308. Each secondary input selector switch 316 selects from among a null input, a test pattern, or a control signal known as an SLS command, which are explained in further detail herein. The test pattern and SLS commands are generated by calibration logic and control circuit 307, which also controls selection of a signal by secondary input selector switch 316. In the preferred embodiment, each line of lines 1 through (N+1) is selected, one at a time, for calibration, while the remaining lines are available for transmitting functional data. The second redundant line (line (N+2)) is available as a true spare, in the event that any line or the transmit or receive circuitry associated with it fails, as for example, by being unable to transmit and receive reliable data even after calibration. Transmit and receiver circuitry associated with line N+2 is normally powered off, and is not continuously calibrated, to reduce power consumption. Line (N+2) is only powered on in the event a spare is needed. In the description herein of certain operations performed by all lines, it will be understood that these operations are not performed on Line (N+2) unless the line is powered on to replace some other line which is not functioning properly.

Calibration Logic and Control circuit 307 also produces a PRBS23 signal 315 for all transmitter drive circuits 303. The PRBS23 signal is a pseudo-random bit sequence of (2\*\*23)−1 bits, or 8,388,607 bits, it being understood that other bit sequences could alternatively be used. This signal is ANDed in each transmitter drive circuit with a respective enable signal (not shown) from calibration logic and control circuit 307, and the result is exclusive-ORed with the output of the respective switch 305. Disabling the PRBS23 by driving a logic '0' to the corresponding AND gate causes the output of switch 305 to be transmitted unaltered; enabling the PRBS23 by driving logic '1' to the AND gate causes the output of switch 305 to be "scrambled" with the PRBS23 bit pattern (which is then descrambled in the receiver circuit 304). When a null input is provided through a switch 305, a pure PRBS23 signal is transmitted across the corresponding line for use in calibrating the receiver synchronization circuit on the other end. The transmitter drive circuit of the preferred embodiment can thus be used either to scramble functional data being transmitted across the link by enabling PRBS23, or to transmit functional data unaltered by disabling PRBS23. Furthermore, each line can be selectively scrambled or not independently, so that functional data could be transmitted unscrambled while calibration data or commands are scrambled, or vice versa.

In the receiving chip, each receiver synchronization circuit 304 receives data signals transmitted across its corresponding line 302 from the corresponding transmitter drive circuit 303, and outputs a set of P bits in parallel. In the preferred embodiment, $P_{RX}=P_{TX}=4$. However $P_{RX}$ could be 1 or some other number; furthermore, $P_{RX}$ need not be the same as $P_{TX}$. Each receiver synchronization circuit receives a PRBS23 signal from calibration logic and control circuit 309, which is selectively enabled or disabled, and exclusive-ORed with the received data, in a manner similar to the transmitter drive circuits, to selectively descramble the received data or output it unaltered.

Each receiver selector switch 306 receives as input the output sets of M+1 receiver synchronization circuits; in the preferred embodiment wherein M=2, each receiver selector switch receives the output sets of 3 receiver synchronization circuits. I.e., the ith receiver selector switch receives the outputs of receiver circuits corresponding to Line i, Line (i+1) and Line (i+2). Each receiver selector switch 306 selects one of these inputs for output to receiver buffer 311, according to a control signal received from receiver calibration logic and control 309. Receiver buffer stores the output of the selector switches 306 until the data is retrieved for use by internal logic within the receiving chip.

Collectively, receiver selector switches 306 perform a function complementary to that of transmitter selector switches 305. I.e., receiver selector switches are capable of selecting the outputs of any arbitrary N receiver synchronization circuits 304 for storing in receiver buffer 311. Or put another way, receiver selector switches 306 can prevent the output of any arbitrary two receiver synchronization circuits from entering buffer 311. Thus, when a line is being calibrated, its output is not selected by receiver selector switches for storing in receiver buffer 311. In this manner, it is possible to select one line at a time for calibration, preventing its output from reaching receiver buffer 311, while N of the remaining lines are used to transmit functional data, the line being selected for calibration being rotated until all lines of the (N+1) lines are calibrated. Switching and rotation of lines for calibration or other purposes is accomplished in a straightforward manner, without complex timing issues, because all controls and inputs to the switches are synchronized and operating in the same clock domain. This preferred embodiment of a receiver circuit also produces a low power and efficient design.

Receiver calibration logic and control circuit 309 controls the calibration of receiver synchronization circuits 304 at power-on time, and the dynamic calibration of these circuits during operation, i.e. while the link is transmitting functional data. Circuit 309 controls a bank of N+2 receiver coefficient registers 310, each receiver coefficient register corresponding to a respective receiver synchronization circuit 304 and holding individually calibrated coefficients for the corresponding receiver synchronization circuit. In order to support calibration, receiver calibration and logic control circuit 309 receives the $P_{RX}$-bit output of each receiver synchronization circuit 304, and adjusts the coefficients in the corresponding register 310 to produce an optimum stable output, as described in further detail herein.

An interface clock 312 provides clock signals to transmit drive circuits 303A and receiver synchronization circuits 304A. In the preferred embodiment, the interface clock is generated in the transmitting chip. The interface clock is driven locally to each of transmit drive circuits 303A, which may require one or more local clock signal drivers (not shown) to achieve the necessary fan-out, and driven across the chip boundaries to the receiving chip on clock line 313 to clock receiver 314 in the receiving module. Clock line 313 runs physically parallel to parallel data lines 302. Clock receiver 314 is preferably a phase-locked loop with as many drivers as are necessary to distribute the clock signal to the N+2 receiver synchronization circuits 304. In the preferred embodiment, clock receiver actually generates four clock signals for distribution, each of the same frequency and 90 degrees out of phase with one another. Although as shown in FIG. 3, the interface clock is generated in the transmitting chip, it could alternatively be generated in the receiving chip, or could be generated in some module external to both the transmitting chip and the receiving chip.

Interface clock provides a reference clock frequency for operation of the transmitter drive circuits 303 and ensures that all data signals on lines 302 correspond to this reference frequency. Similarly, selective circuitry in receiver synchronization circuits 304 which samples the incoming data signals operates according to this reference clock frequency. In the preferred embodiment, data is transmitted on each line at the rate of four bits per cycle of the reference clock frequency, it being understood that this data rate with respect to the clock frequency could vary.

Although there is a common reference clock frequency for both the transmitter drive circuits and the receiver synchronization circuits, it is not true that sampling is performed in the receiver on a common clock signal. Due to variations in physical length of data lines 302, stray capacitance, and other factors, the data signal arriving in each receiver synchronization circuit arrives at a respective phase shift from the reference clock. These phase shifts are independent of one another in the sense that the hardware does not synchronize them to a common phase, and all of the phase shifts may be different.

Therefore, the incoming signal on each line 302 is synchronized to a respective independent clock domain, having a frequency synchronized to the interface clock 312 and having a respective independent phase shift from the interface clock 312. A respective independent phase rotator associated with each receiver synchronization circuit provides a respective phase shifted clock signal to the synchronization circuit for use by at least some of the circuit elements therein, particularly for use by the sampling latches. This allows the receiver synchronization circuits to properly sample incoming data on different lines at different phase shifts.

The output of receiver synchronization circuits 304 is provided to switches 306 and clocked into a common receiver buffer 311. This output is synchronized to a common clock domain, i.e. all of circuits 304 provide output synchronized to the same clock. Data is clocked into receiver buffer 311 in this common clock domain, and calibration logic and control circuitry 309 operates in this common clock domain. In the preferred embodiment, this common clock domain is a clock domain used for internal logic in the receiving chip, so that all downstream logic uses this same clock without further clock domain conversion. This clock domain of the receiving chip's internal logic is herein referred to as the receiver host clock domain for clarity of description. However, it should be understood that a common clock domain for output of the synchronization circuits need not be the same as the clock domain for internal logic in the receiving chip; it could alternatively be a clock domain derived from interface clock signal 312, or some other clock domain. This common clock domain need not be the same frequency as the interface clock.

Figure 4:
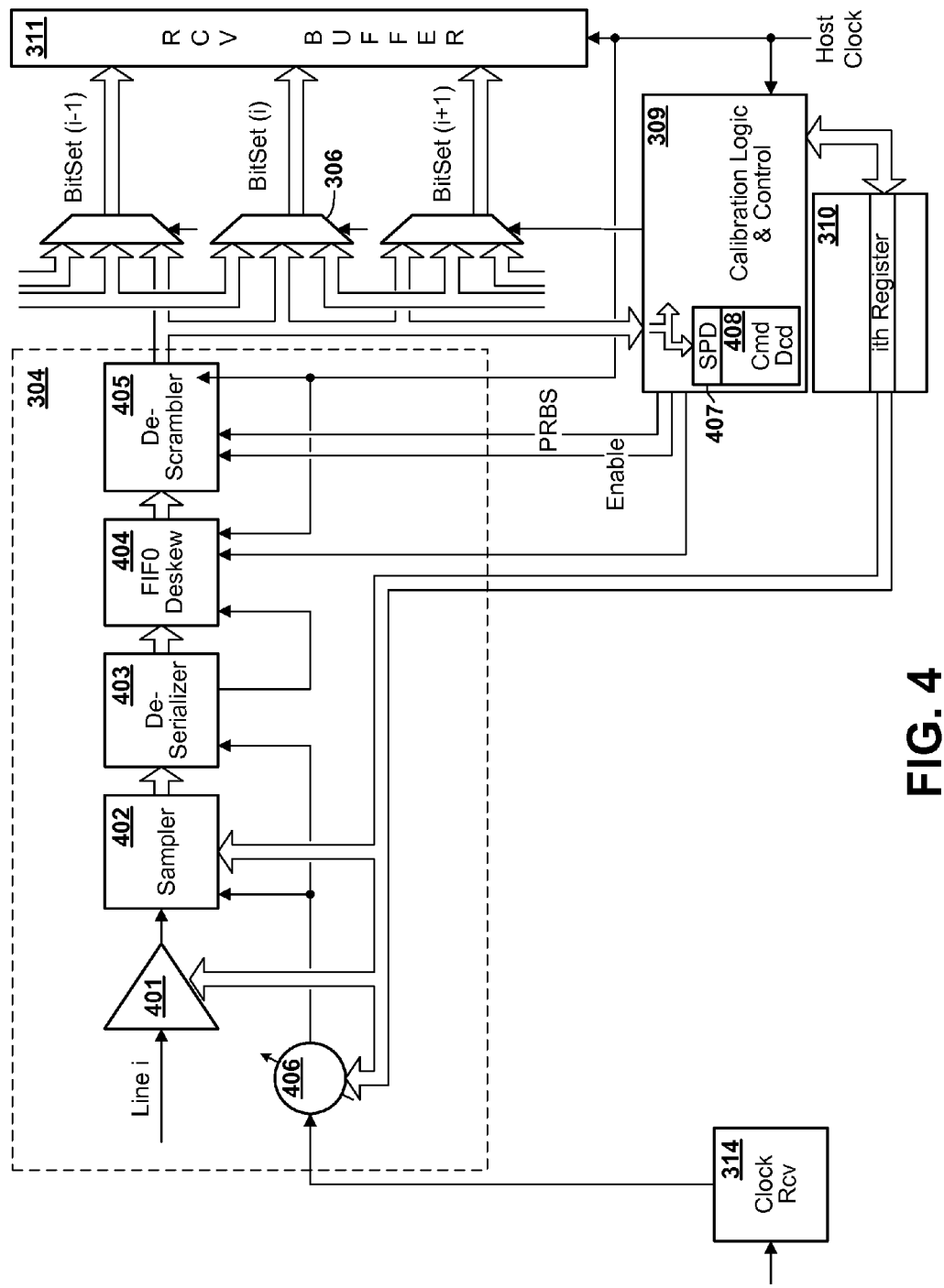
FIG. 4 is a diagram showing in greater detail a representative receiver synchronization circuit of a point-to-point link of parallel lines and associated calibration circuitry, according to the preferred embodiment.

FIG. 4 is a diagram showing in greater detail a representative receiver synchronization circuit 304 and its association with certain other elements of a unidirectional half 301 of a point-to-point link of parallel lines, according to the preferred embodiment. The circuit depicted is for a representative ith line of the (N+2) lines 302. An identical receiver synchronization circuit 304 exists for each of the N+2 lines, there being N+2 receiver synchronization circuits.

Referring to FIG. 4, receiver synchronization circuit 304 according to the preferred embodiment comprises receiver amplifier 401, sampler 402, deserializer 403, FIFO deskew buffer 404, descrambler 405, and phase rotator 406.

Receiver amplifier 401 is an analog circuit which amplifies and/or provides a voltage offset to an incoming data signal on line i. The amplified/offset signal produced by the receiver amplifier is input to sampler 402. Sampler 402 contains one or more (i.e., preferably 4) sampling latches which sample the input at respective phases of a clock domain local to synchronization circuit 304, produced by phase rotator 406. Sampler provides one output line corresponding to each sampling latch. Deserializer 403 selects outputs of the sampler at appropriate times, and stores them in a latch bank on a common half-frequency clock signal derived from phase rotator 406 (herein referred to as the deserializer clock, or R4 clock). Deserializer produces $P_{RX}$ bits (preferably 4) in parallel as output from the latch bank on this deserializer clock signal.

FIFO deskew buffer 404 contains multiple latch banks which add an adjustable delay to the $P_{RX}$-bit output of deserializer 403. FIFO deskew buffer preferably outputs $P_{RX}$ bits (i.e., 4 bits) in parallel after the adjustable delay, the data being the same as the data output of deserializer 403. The latch banks in the FIFO deskew buffer clock data in on the deserializer clock signal. The delay of the FIFO deskew buffer 404 is adjusted in increments of $P_{RX}$ bit times to compensate for variations in data skew among the different lines 302 of unidirectional half 301 of the link, so that the output of FIFO deskew buffer is synchronized to the output of the FIFO deskew buffers corresponding to the other lines. Unlike the deserializer, the outputs of the FIFO deskew buffers 404 in unidirectional half 301 of the link are synchronized to the receiver host clock domain.

The $P_{RX}$-bit output of FIFO deskew buffer 404 is provided to descrambler 405. Descrambler 405 descrambles scrambled data to restore it to its original form. I.e., in the preferred embodiment, a pseudo-random bit pattern is mixed with the data transmitted across the interface by transmitting circuit 303. Mixing data with a pseudo-random bit pattern can have several advantages: it "whitens" or spreads out the spectral content of the data stream, eliminating any repetitive patterns which might otherwise degrade receiver performance; it prevents a long string of zeroes or ones in the original data from being transmitted across the line as all zeroes or all ones; and it can reduce electro-magnetic interference. Since the scrambled data is not an encoding which expands the number of bits in the data stream, it does not guarantee a logical transition with any minimum frequency; it simply makes a long string of zeroes or ones very unlikely. Descrambler 405 uses a reverse transformation of the scrambled data to restore it to its original form. Each descrambler receives a respective enable signal and a common PRBS23 signal from calibration logic and control 309. The two signals are ANDed in the descrambler, and the result is exclusive-ORed with the data. The enable signal is used to selectively turn descrambling on or off in each receiver synchronization circuit, depending on whether the data being transmitted across the corresponding line is currently being scrambled or not. Each descrambler therefore outputs $P_{RX}$ bits in parallel, synchronized to the receiver host clock domain.

Among the advantages of the transmitter drive circuit and receiver synchronization circuit of the preferred embodiment is that scrambling and descrambling of data, and in particular functional data, can be selectively turned on or off. Calibration can be performed in a particular line using a PRBS23 or other suitable test pattern which guarantees any required characteristics, while functional data can independently be transmitted either scrambled or unscrambled. Certain advantages of scrambling functional data are explained above, but scrambling of functional data also consumes significant amounts of power. If scrambling of functional data is not necessary to achieving the requisite performance of the interface, then power can be conserved by shutting off scrambling. Circuit designers may not know in advance whether scrambling of data will be necessary in each and every application of an integrated circuit chip design, so providing the capability to selectively scramble data where necessary for performance, or not scramble functional data to reduce power consumption where not necessary for performance, provides the designers with added flexibility. The decision whether or not to scramble functional data can even be made dynamically within a given digital data system by monitoring the amount of drift in the various calibrated coefficients between calibration intervals. For example, where there is very little change in calibrated coefficients, it may be assumed that scrambling may be unnecessary; where large changes in coefficient values are observed, scrambling may be needed to hold drift to manageable levels. Such monitoring could also be used to vary the calibration interval.

The $P_{RX}$-bit parallel output of each descrambler 405 is provided to one or more respective switches 306 and to receiver calibration logic and control circuit 309. Each switch receives the output of (M+1) descrambler circuits (where M is the number of redundant lines); in the preferred embodiment, each switch receives the output of three descrambler circuits. In this embodiment, each descrambler except the first two and the last two provide their output to three respective switches; the first and last provide output to only one switch each, while the second and next to last provide output to two switches each. Each switch 306 selects a single one of these outputs for input to receiver buffer 311. Receiver buffer 311 clocks in the output of the switches 306 synchronously with the receiver host clock domain.

Phase rotator 406 receives a redriven interface clock signal from clock receiver 314, this redriven interface clock signal being the same input for all phase rotators. Preferably, clock receiver generates four clock signals of identical frequency to the signal it receives over the clock line, and at successive 90 degree phase offsets from one another. Phase rotator provides an adjustable phase shift of this redriven interface clock signal to produce a pair of phase shifted signals (herein designated R2+ and R2−), 180 degrees out of phase from each other and at double frequency from the original interface clock signal, for use by certain elements of receiver synchronization circuit 304. In particular, the pair of phase shifted signals is used to clock the sampling latches of sampler 402 and deserializer 403. The deserializer halves the frequency of the phase shifted signal (i.e. to the original interface clock signal frequency) for use by deserializer 403 and FIFO deskew buffer 404. Since the amount of phase shift is individually adjustable in each of the phase rotators, the output clock signal is an independent clock domain, which is particular to the corresponding receiver synchronization circuit which uses it. Each synchronization circuit contains its own phase rotator 406, rotating the input interface clock signal an independently adjustable amount, to produce a corresponding independent clock domain to optimally sample the arbitrary phase of the incoming data signal, the phase being arbitrary due the effects of data skew.

Calibration logic and control circuit 309 received the $P_{RX}$-bit descrambler output (i.e., in the host clock domain), which is used to perform calibration of receiver synchronization circuit 304 and coordination of switching and other calibration actions, as described further herein. In the preferred embodiment, control information for coordinating calibration actions is carried in "SLS commands" on a line selected for calibration along with test pattern data. Calibration logic and control circuit includes static pattern detector 407 for detecting an SLS command received, as well as SLS command decoder 408 for decoding the command and taking appropriate action.

During calibration, calibration logic and control circuit 309 determines calibration coefficients for receiver synchronization circuit and stores them in a corresponding receiver coefficient register of a bank of receiver coefficient registers 310, there being one such register for each receiver synchronization circuit 304. Calibration logic and control circuit also aligns the outputs of the multiple FIFO deskew buffers 404 with respect to one another. Both calibration logic and control circuit 309, and receiver coefficient registers 310 are in the receiver host clock domain. The calibration coefficients in receiver coefficient register include an amount of phase rotation to be performed by phase rotator 406, gain and offset coefficients for receiver amplifier 401, and individual sampling latch offsets of sampler 402.

Figure 5:
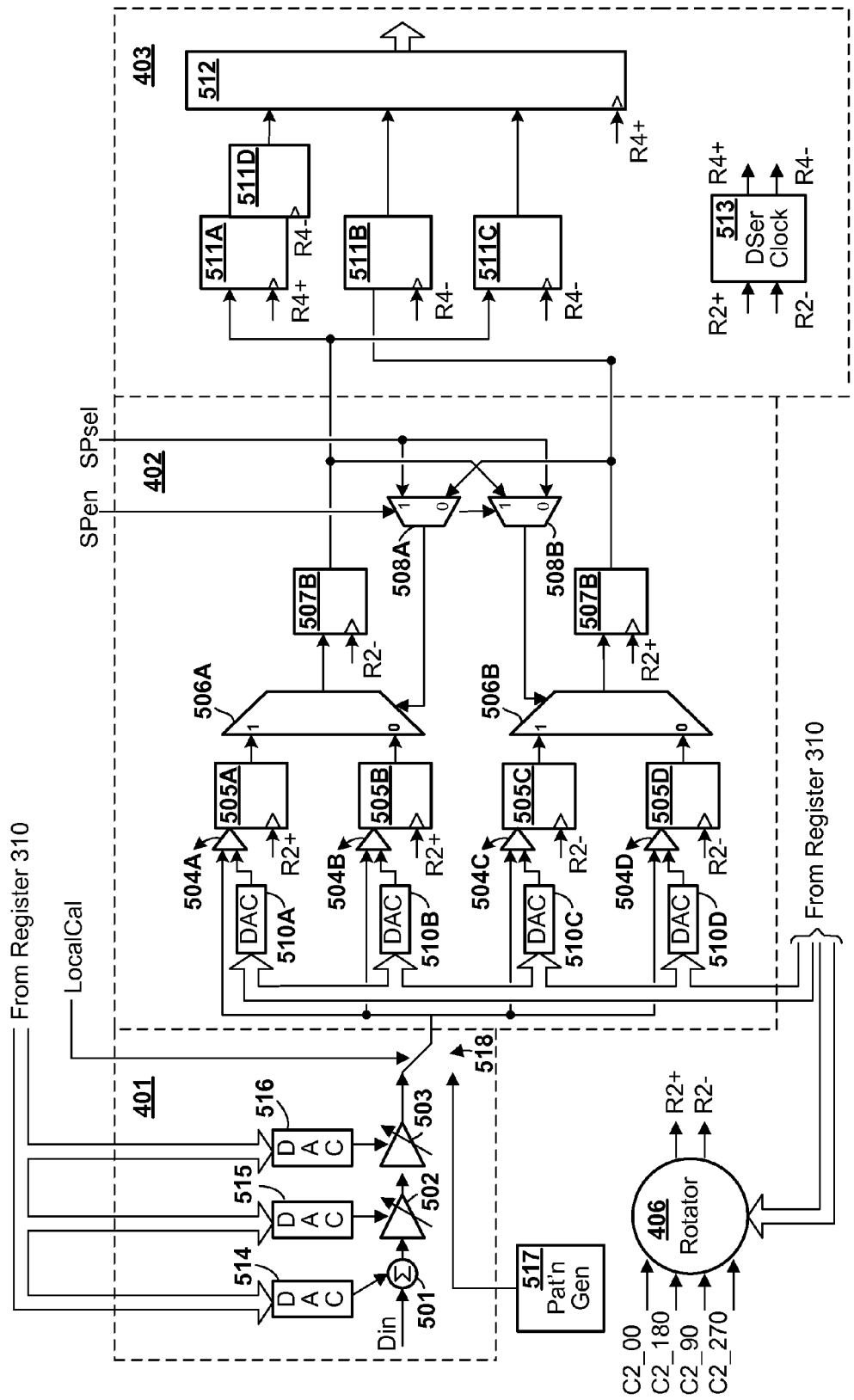
FIG. 5 is a diagram showing in greater detail certain portions of the receiver synchronization circuit shown in FIG. 4 including sampling latches, according to the preferred embodiment.

FIG. 5 is a diagram showing in greater detail certain portions of the receiver synchronization circuit shown in FIG. 4, according to the preferred embodiment. Referring to FIG. 5, incoming data passes through an offset adder 501, variable gain amplifier 502, and continuous time linear equalization filter 503, in that order, all within receiver amplifier circuit 401. Offset adder 501 adds a calibrated offset to the incoming data signal. The value of this offset is determined during calibration, stored in the corresponding receiver coefficient register 310, and provided to digital-to-analog converter (DAC) 514 to generate an analog offset signal corresponding to the value of the offset coefficient for offset adder 501. Variable gain amplifier (VGA) 502 provides a variable gain according to a calibrated gain coefficient, which is stored in receiver coefficient register and provided to DAC 515 to generate an analog gain signal for VGA 502. Continuous time linear equalization filter (CTLE) 503 is a linear amplifier providing adjustable poles and zeroes to create an emphasized high-frequency response (peaking) to compensate for lossy transmission media. A calibrated peaking amplitude is stored in receiver coefficient register 310 and provided to DAC 516 to generate a peaking amplitude signal for CTLE 503.

The resultant adjusted and amplified signal produced by the receiver amplifier circuit 401 is driven simultaneously to four comparators 504A-D (herein generically referred to as feature 504), each providing input to a respective latch 505A-D (herein generically referred to as feature 505). One pair of latches 505A,B is used for sampling even data bits, while the other pair of latches 505C,D is used for sampling odd data bits. A respective selector 506A,B (herein generically referred to as feature 506) selects the output of one latch of each pair for input to respective secondary latches 507A,B (herein generically referred to as feature 507). The outputs of the secondary latches 507 are input to deserializer 403.

A pair of sampling latches 505 is provided for each of even and odd bits so that a different latch may be used depending on the immediately preceding bit, allowing a different value to be used for sampling comparison. I.e., due to inherent impedance of the line, the voltage value following a logical transition (from '0' to '1' or vice-versa) is somewhat different from a voltage value for the same logical value, where there was no transition from the previous bit (two '1's or two '0's in succession). During normal operation, signal SPen is set to '1', allowing the value of the previously sampled bit to pass through switches 508A, 508B and control switches 506, which select a sampling latch 505. During certain calibration operations, SPen causes switches 508A,B to substitute a signal SPsel, generated by calibration logic and control circuit 309, for controlling switches 506.

Deserializer 403 includes delay latches 511A-D for capturing and delaying two even bits and one odd bit, deserializer output register 512 for outputting a 4-bit nibble in parallel, and deserialized clock generator 513 for generating a local clock signal for use by certain elements of deserializer 403 and FIFO deskew buffer 404. Delay latches 511A-D enable all four data bits to be clocked into deserializer output register 512 simultaneously, so that four bits are output from register 512 in parallel.

Receiver amplifier portion 401 further contains a secondary offset amplifier 517 tied to a null input value, and a switch 518 which can alternatively enable input from line 302 through offset amplifier 501, variable gain amplifier 502 and CTLE 503, or from a null input through secondary offset amplifier 517. During normal operation, switch 518 enables input from line 302 through elements 501, 502 and 503. The null input through secondary offset amplifier 517 is only used for certain calibration operations, as described further herein.

As described above, phase rotator generates a pair of phase shifted signals, 180 degrees out of phase from each other and at double frequency from the original interface clock signal. In the preferred embodiment, four bits are transmitted on each line 302 with each cycle of the interface clock. Since the phase rotator generates signals at double frequency, two bits are received on the line with each cycle of resultant phase shifted signal. The pair of phase shifted clock signals are therefore designated R2+ and R2−. The even latch pair 505A,B samples on the R2+ clock signal, and the odd latch pair 505C,D samples on the R2− clock signal. Secondary latches 507 reverse this orientation, so that data is clocked into the secondary latches a half cycle after being captured by latches 505. Deserializer clock generator 513 derives a deserializer clock signal pair from the phase shifted signals R2+, R2− at half the frequency of R2+, R2−. Since four bits are received during this half-frequency cycle, the clock signals generated by deserializer clock generator 513 are designated R4+, R4−. Delay latch 511A clocks its signal in on the R4+ clock, while delay latches 511B-D clock their respective signals in on the R4− clock. All signals are clocked into the deserializer output register 512 on the R4+ clock.

Figure 6:
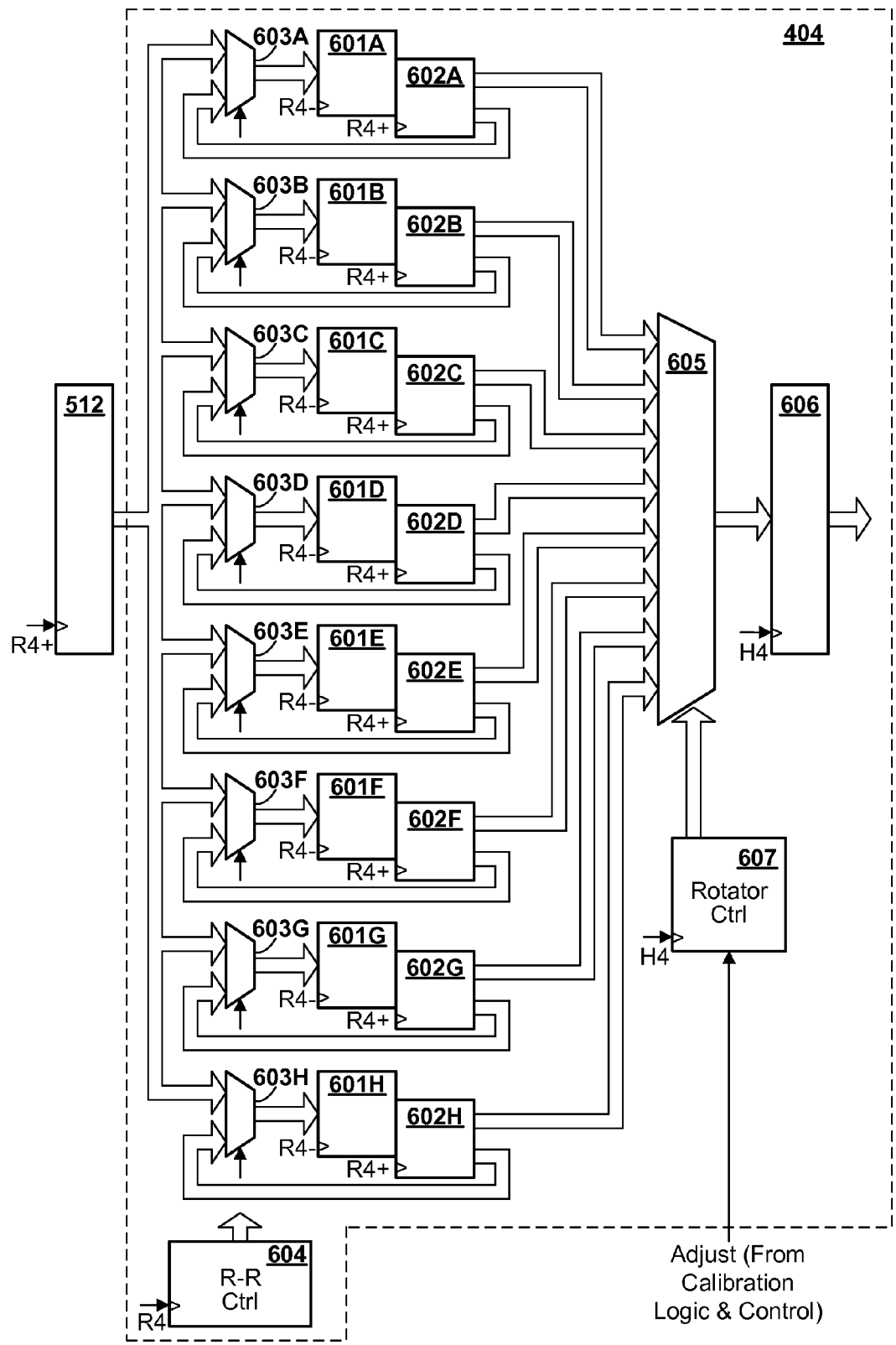
FIG. 6 is a diagram showing in greater detail certain portions of the receiver synchronization circuit shown in FIG. 4 including FIFO deskew buffer, according to the preferred embodiment.

FIG. 6 is a diagram showing in greater detail certain portions of the receiver synchronization circuit shown in FIG. 4 including FIFO deskew buffer 404, according to the preferred embodiment. FIFO deskew buffer includes multiple of delay register pairs, each containing a respective primary delay register 601A-H (herein generically referred to as feature 601) and a respective secondary delay register 602A-H (herein generically referred to as feature 602, the preferred number of delay register pairs being eight, although this number could vary. Each primary delay register 601 and each secondary delay register is a respective bank of four latches, one for each bit of parallel data. As shown in FIG. 6, primary delay registers 601 use the R4− clock (one-half cycle behind deserializer register 512), while secondary delay registers use the R4+ clock (one-half cycle behind the primary registers). A respective feedback switch 603A-H (herein generically referred to as feature 603) is associated with each pair of delay registers. The feedback switch selects either the output of deserializer register 512 or the output of the corresponding secondary register 602 for input to the corresponding primary register 601. A round-robin control 604, synchronized by the R4 clock, selects each switch 603 in turn to receive the input from deserializer register 512. During cycles in which a switch 603 is not selected by the round robin control, the switch feeds back the output of the secondary delay register to the primary register. Thus the data in each pair of delay registers is replaced every eight cycles of the R4 clock with newly arriving data.

The output of each secondary delay register 602 is connected to alignment switch 605, which selects one of these outputs for input to FIFO deskew output register 606. FIFO deskew output register is a set of four latches, one for each parallel bit, which are clocked by the receiver host clock (designated H4). This clock is preferably of the same frequency as the interface clock and the R4 clock, but of indeterminate phase with respect to the other two.

Alignment switch 605 selects each output of a secondary delay register 602 in turn in a round-robin manner, under control of rotator control logic 607. Rotator control logic is also clocked by the receiver host clock, although not necessarily on the same clock phase as FIFO deskew output register 606. Normally, rotator control logic 607 operates independently, without any external input except the clock signal. However, during power-on calibration, calibration logic and control circuit 309 can incrementally advance the currently selected primary delay register output in order to align the outputs of all the FIFO deskew output registers 606 with respect to one another.

By selectively adjusting the output selected by rotator control 607, it is possible to adjust the length of time the data waits in a primary and secondary delay register before being clocked into output register 606. Since all deskew output registers 606 use the same receiver host clock signal, all are synchronized to a common clock domain. By adjusting the delay time in the delay registers, it is possible to align all output registers 606 with respect to one another.

It is significant that the deskewing delay includes delay through multiple successive latches, i.e. memory elements which hold a data value through at least some portion of a clock cycle. Thus, deskew delay is not limited to delay through some number of gates or analog circuit elements, and relatively large skew is easily compensated. As noted above, the data in a delay register is replaced every eight cycles of the R4 clock, amounting to a time period equivalent to that required to transmit 32 successive bits on a single line. Thus, a 32 bit-time window is established by the FIFO deskew buffers, whereby any amount of skew falling within the window is automatically accommodated by the deskew buffers. As a result, the output of the receiver synchronization circuit according to the preferred embodiment is effectively isolated from even large amounts of dynamic and static data skew at the input.

Figure 7:
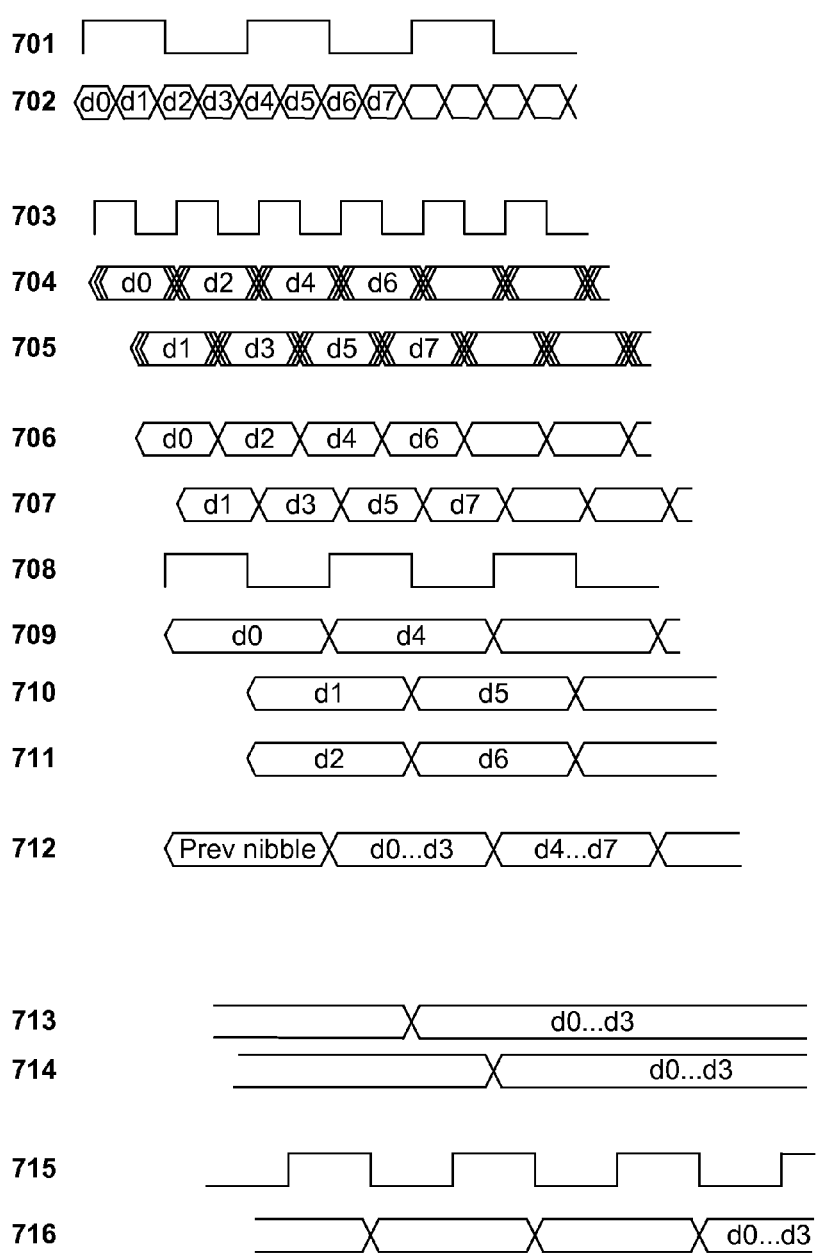
FIG. 7 is a timing diagram showing the propagation of data signals though certain portions of the receiver synchronization circuit of FIG. 4, according to the preferred embodiment.

FIG. 7 is a timing diagram showing the propagation of clock and data signals though certain portions of the receiver synchronization circuit of FIG. 4, according to the preferred embodiment. The left portion of the figure illustrates a representative relative timing of selective signals during operation. The right hand portion of the figure is a simplified representation of certain circuitry described above and illustrated in FIGS. 4, 5 and 6, which is shown as a visual aid for use in identifying the location of the corresponding clock or data signal.

Referring to FIG. 7, signal 701 represents an interface clock signal, i.e. a signal transmitted across line 313. Signal 702 represents the timing of a data signal received over line 302 and propagated through receiver amplifier 401. It will be observed that there are four serial bits of data in signal 702 for each cycle of interface clock signal 701; these bits need not have any phase synchronization with respect to the interface clock signal. Although there is a small delay associated with propagation through receiver amplifier 401, this delay is due to the inherent delay of the analog circuitry, and is unrelated to the timing of clock signals.

Signal 703 represents one of the phase shifted clock signals generated by phase rotator 406. If we assume that the latches sample on the falling edge, signal 703 is the R2−signal (but it could alternatively represent the R2+ signal if latches sample on the rising edge). Signal 704 represents the captured bits in even sampling latches 505A,B, which sample on the R2+ clock, and signal 705 represents the captured bits in odd sampling latches 505C,D, which sample on the R2− clock. The multiple rising and falling lines in the signals are used to illustrate that the two latches of a pair (e.g. latches 505A and 505B) do not receive precisely the same signal, since each uses a different offset coefficient in its corresponding comparator 504. As shown, the even bits are captured in sampling latches 505A,B on the rising edge of signal 703, and the odd bits are captured in sampling latches 505C,D on the falling edge of signal 703, i.e., the odd bits are captured 180 degrees out of phase of the R2 signal from capture of the even bits.

As explained, selectors 506 select one latch of each pair depending on the previous data bit, the selected output being clocked into secondary latches 507. Signals 706, 707 show the even and odd data, respectively, captured in secondary latches 507A and 507B, respectively. It will be observed that this data is delayed one-half cycle from that of data in sampling latches 505. I.e., even secondary latch 507A uses the R2− clock phase, while odd sampling latch uses the R2+ clock phase.

Signal 708 represents an R4 clock signal generated by deserializer clock generator 513. Signal 708 could represent the R4− signal (assuming sampling on the falling edge) or the R4+ signal (assuming sampling on the leading edge), it being understood that the complementary signal is 180 degrees out of phase. The R4 signal is half the frequency of the R2 signal and derived from it Signals 709-711 represent the contents of latches 511A, 511B and 511C, respectively. The first bit of each nibble (designated d0) is captured in latch 511A from the contents of latch 507A on the R4+ clock, and is clocked into latch 511D on the R4− clock, a half cycle later. The second and third bits (d1, d2) are captured in latches 511B, 511C from latches 507A, 507B, respectively, on the R4− clock, i.e., half a cycle of the R4 clock after the d0 bit is clocked into latch 511A, (a full cycle of the R2 clock later).

On the next R4+ clock, bits d0, d1 and d2 are available from latches 511D, 511B and 511C, respectively. Bit d3 is directly available from latch 507B. All four bits are then clocked into register 512, the entire nibble now being available as a parallel output of register 512. Signal 712 represents the contents of register 512.

The R4 clock is provided to FIFO deskew buffer 404. FIFO deskew buffer preferably contains eight primary delay registers 601 clocked on the R4− clock, each of which is selected in turn. Once clocked in, the data remains in the primary delay register 601 for eight cycles of the R4 clock, amounting to 32 bit times (the time it takes to transmit 32 serial bits across the link). Although the data remains in each of the primary delay register 601 and the secondary delay register 602 a respective fixed length of time, it can be output to the FIFO deskew output register 606 from the corresponding secondary register 602 any time during which it is in that register. Signal 713 represents the contents of the primary delay register 601, and signal 714 represents the contents of secondary delay register 602 (delayed one-half cycle of the R4 clock) from the primary delay register.

An output register 606 in the FIFO deskew buffer 404 clocks data in on the receiver host clock signal, represented as signal 715. Data in the deskew output register is represented as signal 716. Although a particular delay from the primary delay register 601 is illustrated, this delay is in fact variable, and could be longer or shorter. For example, in the illustration of FIG. 7, bits d0 . . . d3 were in fact available for clocking into register 606 one cycle of the host clock sooner, the delay being added in this example to align these bits with the outputs of other receiver synchronization circuits. Bits d0 . . . d2 alternatively could have been clocked into register 606 in any of the six host clock cycles after the one illustrated in the example. Thus, the data in the deskew output register is aligned with respect to data received on other lines as a result of the variable delay in FIFO deskew buffer 404, and is synchronized to the receiver host clock signal.

A receiver synchronization circuit 304 having certain components and specific adjustable parameters and timing characteristics has been described herein and illustrated in FIGS. 4, 5, 6 and 7 as a preferred embodiment. However, it should be understood that a receiver synchronization circuit can be any combination of circuits which receives an input signal having an arbitrary skew within some permissible design range over a line 302, and produces data synchronized to that of the other receiver synchronization circuits of the other lines. Many variations are possible in implementing a receiver synchronization circuit. Some circuit elements shown and described herein may not be present, other elements not shown may be present, some elements may be combined, and different adjustable parameters may be used. By way of illustration of certain variations and not limitation, the number of sampling latches may vary; there may or may not be different latches or latch pairs for even/odd data; there may or may not be alternate latches for the same data and a selection mechanism for selecting the output of one; the arrangement of input amplifiers and offsets may be different and use different elements, a peaking adjustment such as provided by CTLE may or may not be present, and might be combined with other elements; the number of delay registers in a FIFO deskew buffer may vary; different mechanisms may be chosen for introducing delay for purposes of aligning data; the number and phase of clock cycles for performing various functions may vary; and so forth.

As one particular variation, although descrambler 405 is shown in the preferred embodiment as a form of data transformation device for ensuring transition density of the transmitted data, an alternate form of data transformation device for ensuring transition density, or no such data transformation device, may be present. An alternate form of data transformation device for ensuring transition density may be, for example, a decoder which restores encoded data to its original form from an encoding (e.g., according to an 8/10 bit encoding) which expands the number of bits is a stream of data to ensure that logical transitions occur with some minimum frequency, it being understood that in such case a complementary encoder would be present in the transmitter drive circuit 303 in place of a scrambler. The descrambler or other data transformation device for ensuring transition density is intended to spread out the spectral content of the signal and avoid long sequences of zeroes or ones being transmitted. If there is sufficient degradation of the receiver or drift in the phase of transmitted data with respect to the receiver clocks, this could cause data to become unreliable. However, if the receiver circuits are calibrated with sufficient frequency, then it may be possible to detect and correct any such tendency before data is corrupted, and in such case, and possibly others, scrambling or other transformation of data to ensure transition density would be unnecessary. Removal of the scrambler and descrambler would reduce the amount of circuitry in the interface and reduce power consumption. As another variation, a descrambler or other data transformation device need not be located as shown within receiver synchronization circuit 304, and may be alternatively located upstream of the FIFO deskew buffer or downstream of switches 306 or receiver buffer 311 (since the output of the FIFO deskew buffer is synchronized in the receiver host clock domain, although the data is not yet descrambled).

As another particular variation, a deserializer may not be present or may be present downstream of the deskewing latches, so that individual bits are propagated through the deskewing latches instead of multiple bits in parallel.

Calibration of the Receiver

In the preferred embodiment, various coefficients of receiver synchronization circuits 304 are calibrated and stored in registers 310. Calibration is performed at initial power-on of the digital device, and periodically thereafter during operation. Recalibration during operation, herein referred to as "continuous time, dynamic calibration", or simply "dynamic calibration", requires that the interface be able to communicate functional data during calibration. Therefore, lines are calibrated one at a time, using one of the redundant lines, so that enough lines are available to handle functional data while each one is being calibrated in turn.

Figure 8:
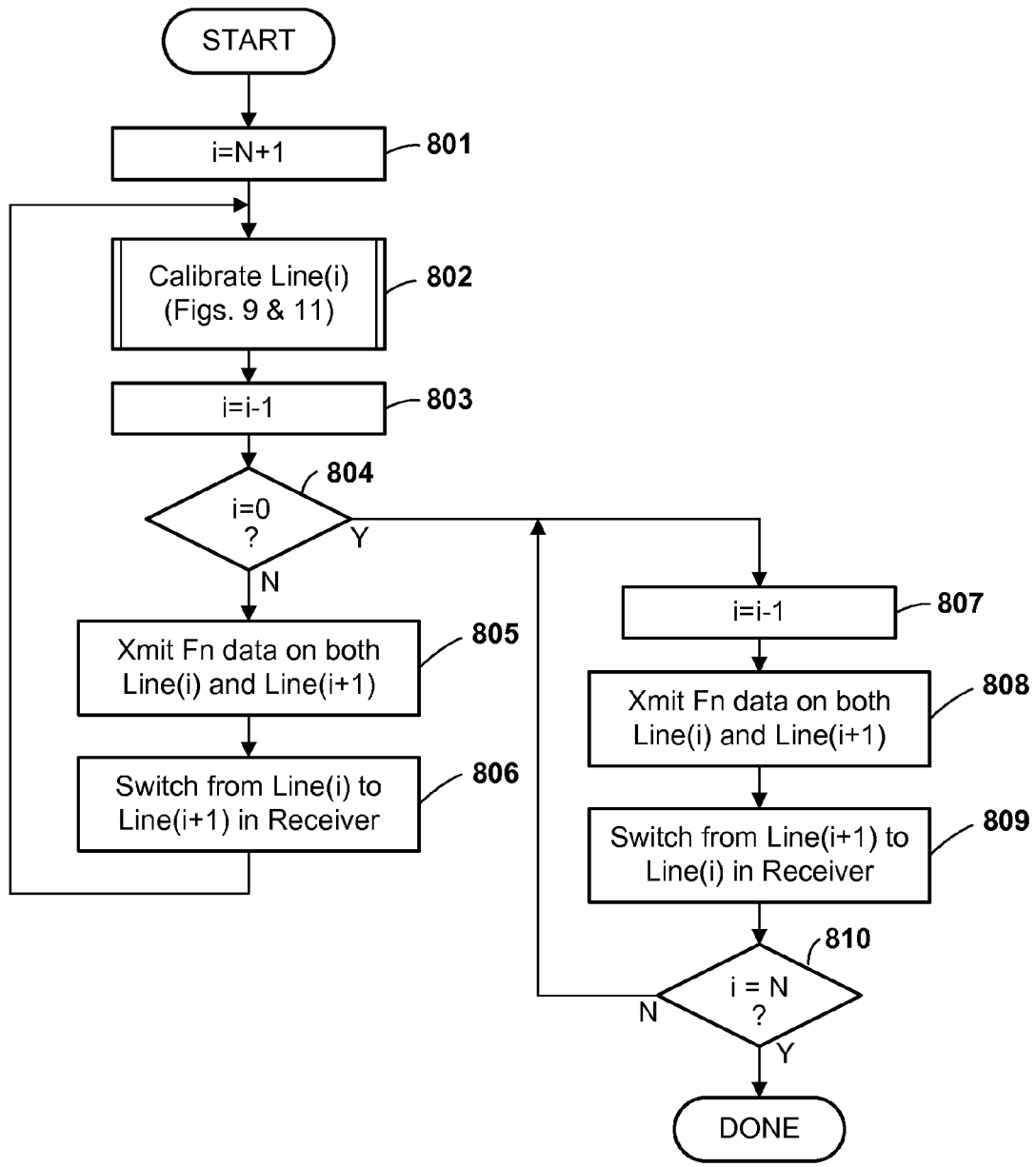
FIG. 8 is a flow diagram showing at a high level a process of dynamic calibration of a unidirectional half of a point-to-point link of parallel lines, according to the preferred embodiment.

FIG. 8 is a flow diagram showing at a high level a process of dynamic calibration of a unidirectional half 301 of the link, according to the preferred embodiment. The dynamic calibration process is invoked periodically during operation of a digital data system, as required to maintain appropriate calibration coefficients for the circuits. In the preferred embodiment, dynamic calibration is invoked continuously, i.e., as soon as all lines have been calibrated, a new round of calibration is invoked to recalibrate them. Alternatively, calibration could be invoked at pre-determined time intervals which are judged sufficiently frequent to counter any possible drift of calibrated coefficients. As an additional alternative, calibration might be invoked upon the occurrence of one or more pre-defined events, such as a change in internal system temperature since the last calibration. A triggering condition for calibration may involve a combination of such factors.

In the description herein, it is assumed that, as a starting point for calibration, Line(1) through Line(N) are transmitting functional data, while Line(N+1) is powered on and available (although not being used for functional data), and Line(N+2) is powered off (and therefore the outputs of the receiver synchronization circuits 304 corresponding to Line (N+1) and Line(N+2) are disabled by switches 306).

Referring to FIG. 8, a line index variable i is initialized to (N+1) (block 801). Line(i) is then calibrated (this action being represented as block 802 in FIG. 8, and shown in greater detail in FIGS. 9 and 11). When finished calibrating Line(i), the line index i is decremented (block 803).

If the line index is greater than 0, the 'N' branch is taken from block 804. At this point, functional data is being transmitted on Line(i), and Line(i+1) is disabled by switches 306 (Line(i+1) being the line that was just calibrated). Transmitter switches 305 cause a copy of the functional data being transmitted on Line(i) to also be transmitted on Line(i+1) (block 805), i.e. the same data is transmitted on both Line(i) and Line(i+1). After sufficient time has elapsed for this functional data to propagate all the way through the corresponding receiver synchronization circuit 304 in the receiving device, receiver switches 306 simultaneously enable Line(i+1) and disable Line(i) (block 806). I.e., the single receiver switch 306 corresponding to the logical bitset being transmitted on both Line(i) and Line(i+1) is switched to select the output of Line(i+1) instead of the output of Line(i). The transmitter can then discontinue sending functional data on Line(i), and the Line(i) is available for transmitting a calibration test pattern or other control data, as described herein. The process therefore returns to block 802 to calibrate Line(i).

If, at block 804, line index i is equal to zero, then all lines have been calibrated, and the 'Y' branch is taken. In this case, the lines will be restored to their initial enabled/disabled state, with Line(1) through Line(N) being used to transmit functional data. Accordingly, line index i is incremented (block 807). At this point, Line(i) is disabled, and is the line used for transmitting test patterns or commands. Transmitter switches 305 cause a copy of the functional data being transmitted on Line(i+1) to also be transmitted on Line(i) (block 808). After sufficient time has elapsed for this functional data to propagate all the way through the corresponding receiver synchronization circuit 304 in the receiving device, receiver switches 306 simultaneously enable Line(i) and disable Line(i+1) (block 809). If line index i<N, then the 'N' branch is taken from block 810, the line index is incremented again at block 807, and the data is again shifted. If, at block 810, line index i=N, then the lines have been restored to their initial condition, the calibration is complete.

In the preferred embodiment, there are two redundant lines, one of which (Line(N+1)) is used for dynamic calibration, while the second (Line(N+2)) is used as a true spare. In the event of failure of any line (e.g., Line(k)) or its associated transmitter or receiver circuitry, for each Line(i), where i>k, switches 305, 306 cause Line(i) to assume the functions normally performed by Line(i−1), and disable any output of Line(k). This is not reflected in FIG. 8. Of course, there could be additional spares, or there might be only a single redundant line (used for calibration) with no additional spares.

In the preferred embodiment, the parallel data link is bidirectional, and both halves of the link are dynamically calibrated, the procedure described above being repeated for both halves. While this could be done serially, in the preferred embodiment it is performed concurrently. Specifically, at approximately the same time that Line(i) is being calibrated at block 802, an OLine(j), being a line of the same link transmitting data in a direction opposite to that of Line(i), is being calibrated in essentially the same manner. The index j is decremented in the same manner as the index i at step 803. Functional data is transmitted on both OLine(j) and OLine(j+1) in the same manner and at approximately the same time that functional data is transmitted on Line(i) and Line(i+1) at block 805. The receiver switches for the OLines simultaneously enable OLine(j+1) and disable OLine(j), in the same manner and at approximately the same time that analogous actions are performed on Line(i) and Line(i+1) at block 806. When the index j reaches zero, the OLines are returned to their initial state in a manner analogous to that described above with respect to blocks 807-810.

While the number of lines in each half of the link could be the same, this will often not be the case, and therefore the two halves of the link will not necessarily finish calibrating all lines at the same time (i.e., index j will not reach zero at the same time as index i). It would be possible for one half of the link to simply wait until the other half is done with its lines, but in the preferred embodiment each half is continuously calibrating its lines, and so will begin calibration again as soon as it is finished. This means that blocks 807-810 are not performed at the same time for each half of the link. Since the time required to perform blocks 807-810 is relatively short compared to the time required to perform block 802, where one half of the link is resetting its lines as illustrated in blocks 807-810 (referred to as "unshadowing"), the other half will simply wait until it is done, so that both begin calibration of the next line (block 802) at approximately the same time.

The switching of different lines for performing calibration or transmitting functional data as described herein requires some degree of coordination between the two devices in communication with each other at opposite ends of the link. In the preferred embodiment, control data for coordinating the activities of the two devices is exchanged by time multiplexing the redundant lines used for calibration, as described in greater detail herein and illustrated in FIGS. 11-13.

In the preferred embodiment, a common calibration logic and control circuit 309 receives as inputs the aligned data outputs of each receiver synchronization circuit, and uses these outputs for calibration. This is digital logic data, not analog voltage levels. A significant feature of the preferred embodiment is that all calibration of the interface is performed with a common calibration circuit and using only the aligned data outputs of the receiver circuits. This embodiment avoids analog measurements and both the static and dynamic manipulation of high-speed latches into and out of the paths from each line in order to ensure and maintain the correct synchronization of the common calibration circuitry. By avoiding analog measurement and calibration circuitry and using a common calibration circuit, a significant amount of complexity and power associated with the calibration process is reduced.

Figure 9:
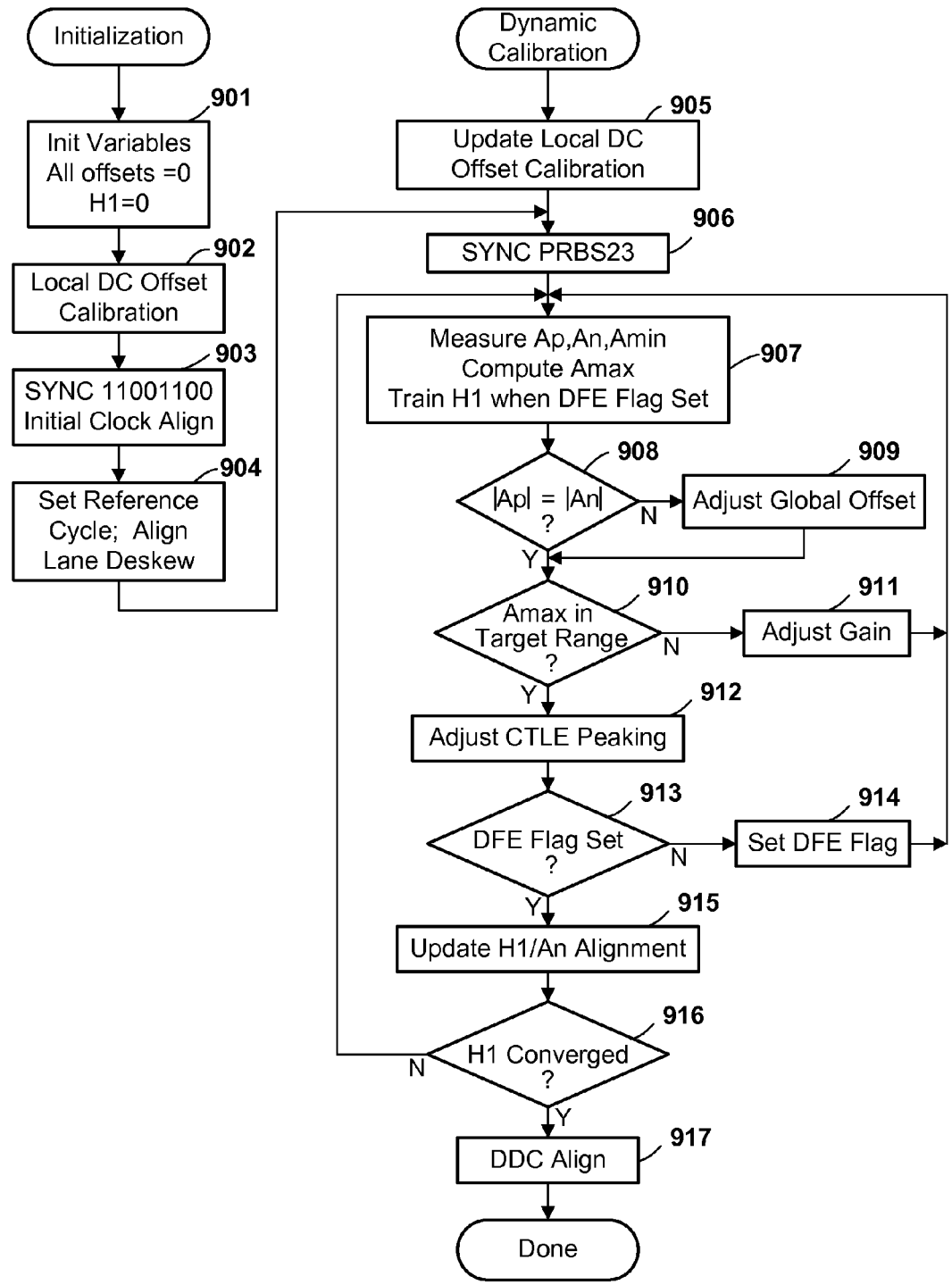
FIG. 9 is a flow diagram showing in greater detail a process of calibrating a single line of a point-to-point link of parallel lines, according to the preferred embodiment.

FIG. 9 is a flow diagram showing in greater detail a process of calibrating receiver circuitry 304 associated with a single line 302 of a point-to-point link of parallel lines, according to the preferred embodiment. FIG. 9 is intended to represent both calibration at power-on time, and dynamic calibration during operation, there being some differences between the two, as noted below. Power-on calibration begins with blocks 901-904, while dynamic calibration begins with block 905; blocks 906-918 are common to both modes. In the case of power-on calibration, the lines are not being used to transmit functional data, and therefore some operations may be performed concurrently or some operations may be performed for all lines before performing others on any line. In the case of dynamic calibration, only one line at a time is calibrated, as explained above with respect to FIG. 8.

Referring to FIG. 9, a calibration at power-on reset begins with initializing all calibrated coefficients to respective initial or default values, such as zero (block 901). A respective offset ("local offset") is then determined for each comparator 504 associated with a sampling latch 505 (block 902), which is intended to compensate for any input offsets in the comparators. The offset to the comparator is represented as a digital data value, which during operation is stored in register 310, and is converted to a corresponding analog voltage offset by the corresponding DAC 510 for use by the comparator 504. At this stage, only the DC portion of the offset, referred to as the "O" coefficient, is determined. During operation, this will be added to another coefficient (the "H1" coefficient) subsequently determined before providing the value to DAC 510. Additionally, an "A" coefficient is used for certain calibration operations, as described herein.

In the discussion herein, it should be understood that, in the preferred embodiment, line 302 is physically a pair of wires providing a differential value. A logical '1' means that one of the lines has a positive voltage with respect to the other, while a logical '0' means that that same line has a negative voltage with respect to the other. Therefore a zero or null differential voltage input signifies a value exactly between a logical '1' and a logical '0'.

For determination of the "O" coefficient values, an input signal is generated in the receiver from an offset pattern source 517, which is substituted for the line input by switch 518. The offset pattern source produces a digital square wave time interleaved with "differential zero" or "null" voltages. Samples for calibrating the "O" coefficents are taken only during the "null" portion of the offset pattern. The square wave portion of the pattern is used to eliminate and DC pattern bias, or "floating body effect", which might otherwise corrupt the offset measurements.

The "O" coefficient for each comparator 504 is determined one at a time, enabling common logic in calibration circuit 309 to be shared among all comparators 504, and among all other lanes. On initial calibration, each "O" coefficient is calibrated using a binary hunt algorithm, described as follows. A mid-range value of the "O" coefficient offset is applied to the corresponding DAC 510, and sufficient time is allowed for the DAC to stabilize. The SPen and SPsel inputs to switches 508 are set to select the output of the latch 505 being calibrated. The selected latch will fill only half (even or odd) of the contents of deserializer register 512, and these bits will propagate through the FIFO deskew buffer 404 and descrambler 405, with descrambling being disabled. A sufficient number of samples (preferably greater than 128) of the output of the descrambler are collected; only the even or odd bits, corresponding to an even or odd latch being selected, are collected at this stage. If the samples contain a predominance of '1's, then the actual offset which is inherent in the comparator circuit is greater than the applied "O" coefficient offset, so it is necessary to increase the applied "O" offset to compensate for it. If the samples contain a predominance of '0's, then the actual offset inherent in the circuit is less than the applied "O" offset, so it is necessary to compensate by decrease the applied "O" offset. In either case, the "O" coefficient is adjusted to a value in the middle of the remaining range of values of the DAC. The DAC is again allowed to stabilize, samples are again collected, and the "O" coefficient is adjusted up or down to the middle of the remaining range according to the predominance of '0's or '1's in the sample. The process iterates to converge the "O" coefficient.

After calibrating the DC offsets ("O" coefficient) of comparators 504, an initial calibration of the phase rotator is performed (block 903). This may be considered a "coarse" calibration for purposes of performing other calibrations herein; a final adjustment of the phase rotator is made later.

To perform the initial calibration of the phase rotator, switch 518 disables the null input and enables input from line 302. Transmitter drive circuits transmit a pattern '110011001100 . . . ' for a defined time, this pattern being supplied on the test line input to secondary input selector switch 316 from calibration logic and control circuit 307 in the transmitter, which causes transmitter selector switch 305 to select the output of the corresponding secondary input selector switch 316 while simultaneously disabling scrambling in the transmitter drive circuit, causing the unaltered test pattern to be transmitted. It will be noted that the received interface clock is initially of unknown phase alignment relative to the incoming data, and furthermore, until calibration of certain other coefficients is complete, recovery of incoming random data will not be reliable. In order to address these issues, a simple pattern of '11001100 . . . ' is first transmitted. This pattern is detectable without full calibration of the receiver circuits, since it is less susceptible to jitter, intersymbol interference and is a lower frequency than the full bit rate. Calibration logic and control circuit 309 adjusts the clock phase produced by phase rotator 406 while simultaneously monitoring the output (i.e., of the descrambler 405, in which descrambling is disabled) to produce a 50/50 balance of '1' and '0' samples of every other sample. This circumstance can only arise when the clock edge coincides with the changing edges of the input pattern. After locating this phase position, the phase rotator is then adjusted one-half the full-speed bit time later, positioning it at the nominal center of the data window, enabling reliable capture of this input data pattern.

The FIFO deskew buffers 404 corresponding to the multiple lines in unidirectional link half 301 are then aligned with respect to one another (block 904). In order to achieve alignment of the FIFO deskew buffers, the '11001100 . . . ' pattern previously described further contains periodic '11110000' segments, which are spaced far apart relative to the anticipated skew on the bus. Due to channel inter-symbol interference (ISI), these pattern segments are not expected to be fully recognized, but the $3^{rd}$ '1' in this segment should be detected reliably. Hence, based only on this single bit, periodic variation from '1100 . . . ' to '1111000' for a single interval provides a clearly recognizable index mark for alignment purposes. Calibration logic and control 309 recognizes the latest arriving '1111' pattern output by the descramblers 405 (in which descrambling is disabled) for all lines, and adds integer units of clock delay (preferably cycles of the host clock) to selective FIFO deskew buffers 404 as necessary to phase align the outputs of all the FIFO deskew buffers to the FIFO deskew buffer output of the latest arriving line.

The initial calibration of the phase rotator and alignment of the FIFO deskew buffer outputs as represented by blocks 903 and 904 are performed only at power-on. During dynamic calibration, the "O" coefficients of the comparators 504 are calibrated again (block 905), using a somewhat abbreviated procedure from that described earlier with respect to block 902.

During dynamic calibration, the local offsets ("O" coefficients) at the sampling latches are updated incrementally, represented as block 905. The input signal is generated in the receiver by offset pattern generator 517, with switch 518 set to enable input from this source, as previously described with respect to block 902. However, the "O" coefficient is not calibrated from scratch using the binary hunt. The existing "O" offset coefficient alone (with the H1 and A coefficients mathematically removed) is applied to the DAC 510. As previously described, the SPen and SPsel inputs to switches 508 are set to select the output of the latch 505 being calibrated. After waiting a brief time for the DAC to stabilize, a set of samples (preferably more than 128) of the target latch output (even or odd) are collected at the output of the descrambler (with descrambling disabled), and it is determined if more 1's or 0's are observed. The DAC "O" offset coefficient is then adjusted upward or downward based on this determination, i.e. the value is incremented if more '1's or decremented if more '0's appear in the sample. In order to comply with the time constraints of the interface architecture, these dynamic calibration updates may be broken into small sub-operations which can complete their task in the time allowed. Additional sub-operations can be processed in a subsequent dynamic calibration interval.

After initial calibration of the "O" coefficients, initial phase rotator calibration, and initial FIFO deskew buffer alignment (in the case of power-on calibration), or after updating the "O" coefficients (in the case of dynamic calibration), calibration logic and control circuit 307 causes the transmitter drive circuit 303 to transmit the PRBS23 pattern repeatedly across the line, this pattern being repeated during subsequent calibration actions (block 906). Optimum calibrated coefficient values are achieved when receiving random data, which is why the PRBS23 pseudo-random test sequence is used. Among the benefits of having a redundant line for use in calibration is that data which is guaranteed to be pseudo-random by design is readily provided, eliminating the need for sophisticated "data randomness" detection and filtering functions which might otherwise be required.

In blocks 907-916, an iterative calibration of the receiver amplifier 401 (i.e., offset adder 501, VGA 502, and CTLE 503) is performed, along with an "H1" coefficient which is added to the "O" coefficient to provide an offset for comparators 504. This portion of the calibration process is referred to as Decision Feedback Equalization (DFE). The basic concept of DFE is to dynamically adjust a binary decision threshold amplitude at the front-end sampling latches, based on the recent history of received input data. Any number of history bits and associated feedback coefficients (taps) can be included, but practical implementations will seek to minimize this number to an acceptable level of performance. Systems can range from 1 tap, to 15 or more taps, depending on application requirements. The primary function of the DFE training system is to measure characteristics of the incoming signal waveform, correlate these with applicable data history, and compute/apply feedback coefficients to the dynamic threshold circuitry so as to optimize the measured results. This implementation is a closed loop feedback system which, after sufficient ""training time"", converges the coefficients to the best possible values.

The DFE process begins by determining values associated with an "A" vector, designated Ap, An and Amin, where Ap represents an average amplitude of a logical '1' at the input to a sampling latch comparator 504, An represents the average amplitude of a logical '0' at the input to a sampling latch comparator, and Amin represents the minimum amplitude of a logical '1' over a large sample size, e.g. 1000 samples (block 907). The Ap and An values are measured separately for each sampling latch 505, while receiving the PRBS23 data pattern. Since this pattern is known to the receiver, the receiver's calibration circuit can compare the known PRBS23 pattern to the data output of descrambler 405 (with descrambling disabled) to identify whether or not any particular bit of data was correctly sensed by the sampling latches. Initially, the "H1" vector is set to zero, and is calibrated in subsequent iterations, as described further herein.

Figure 10:
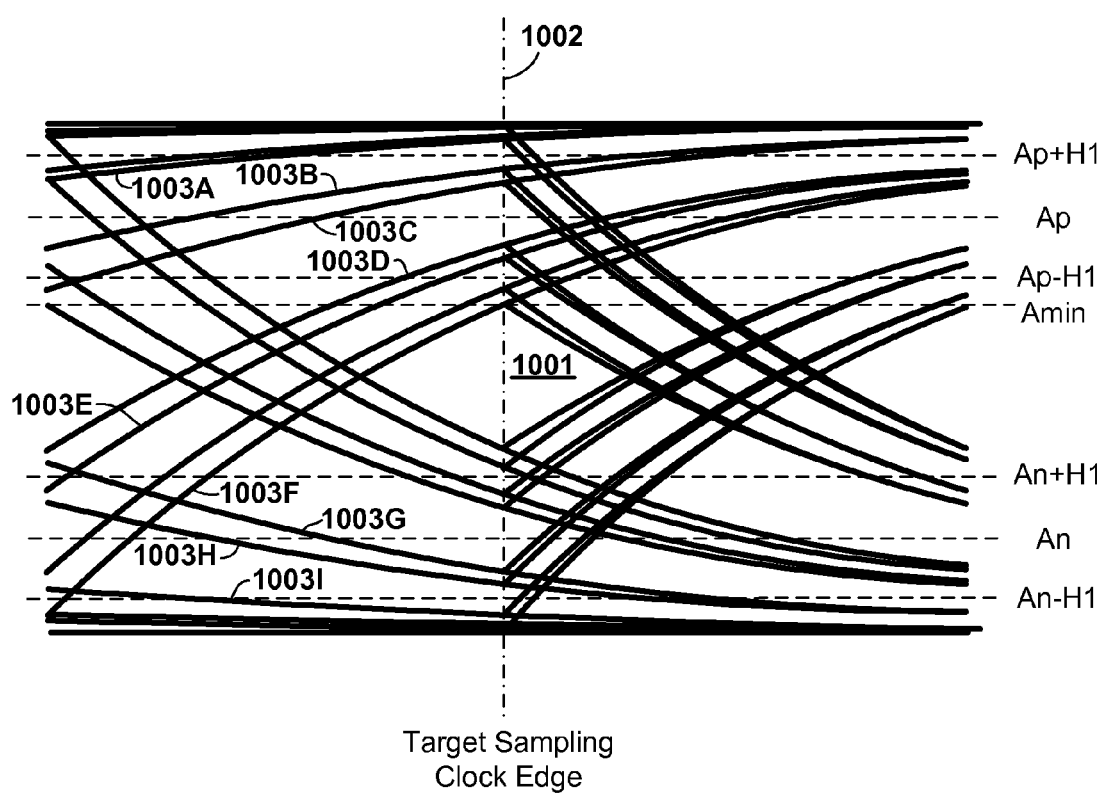
FIG. 10 is an exemplary "eye" diagram showing typical voltage responses vs. time at a sampling latch input, according to the preferred embodiment.

Ap, An and Amin can be conceptually represented in an "eye" diagram. FIG. 10 is an exemplary "eye" diagram showing typical voltage responses vs. time at a sampling latch input. Referring to FIG. 10, voltage curves 1003A-J of multiple data samples overlaid on a single clock strobe 1002 are represented. In some cases, the voltage curve is intended to represent a logical '1' (high voltage) at the clock strobe, while in others the curve represents a logical '0' (low voltage). It will be observed that the value of the voltage at the clock strobe 1002 varies considerably for the same logical value; for example each of curves 1003A-1003F represent a logical '1' at the clock strobe, but the values are substantially different. In particular, the value of the voltage is influenced by the value of the previously received bit of data. If the previously received data bit was also a logical '1', then the current logical '1' generally has a higher voltage reading than it would if the previous bit was a logical '0'.

The central region 1001 is referred to as the "eye". Ideally, the clock is synchronized to sample in the middle of this "eye", as shown, the sensing electronics are calibrated so that the "eye" is as large as possible.

As shown in FIG. 10, Ap represents an average voltage of logical '1's, and crosses the clock strobe line in the middle range between the highest voltage logical '1' (i.e., the top of the voltage range) and the lowest voltage logical '1' (i.e., the top of the eye). A similar observation is made for An. Amin, on the other hand, is approximately the lowest voltage logical '1', i.e., approximately the top of the eye.

Ap or An are measured at a particular sampling latch by setting the SPen and SPsel inputs to switches 508 to select the output of the desired latch for all even or odd data, as the case may be. The "A" vector is incrementally adjusted and added to the previously determined "O" vector of the selected latch as input to the corresponding DAC 510. As the "A" vector is increased, an increasingly larger number of logical '1's will be sensed in the sampling latch as logical '0's due to the increasingly large offset. Similarly, as the "A" vector is decreased, an increasingly larger number of the logical '0's will be sensed as logical '1's. Ap is determined as the value of the "A" vector at which half of the logical '1's are sensed as logical '0's, and An is determined as the value of the "A" vector at which half of the logical '0's are sensed as logical '1's. Amin is similarly determined by decrementing the value of the "A" vector from Ap until there is only one error per 1000 samples, i.e., for every 1000 logical '1's, only one is sensed as a logical '0'.

Four separate values of Ap and An are obtained, one measured at each sampling latch. For subsequent calculations used to calibrate offset adder 501 and variable gain amplifier 502, Ap is the largest of these four separately measured values, and An is the smallest (i.e., the An having the largest absolute value, An being negative). Amin is measured only at the latch having the largest Ap value. A value Amax is computed from Ap and Amin as: Amax=2*Ap−Amin+|H1|. As previously described, H1 is initially 0, and adjusted in subsequent iterations as described herein.

Ideally, Ap is of equal magnitude to and opposite sign from An. If the magnitude of Ap is unequal to the magnitude of An (the 'N' branch from block 908), then the offset value in DAC 511 for use by offset adder 501 is adjusted so that the inputs to the sampling latches are centered at zero, i.e. offset=(Ap+An)/2 (step 909).

The computed value Amax is a representation of the range of voltage values experienced at the inputs to the sampling latches. If the value Amax is outside a target range (the 'N' branch from block 910), the gain coefficient of VGA 502, as input to DAC 515, is incrementally adjusted to bring Amax within or closer to the target range (block 911). This gain adjustment affects Ap, An and Amin, so the calibration logic returns to block 907 to repeat the measurements. The gain coefficient is initially 0 in order to ensure that the sensing electronics are operating in their linear ranges, and incrementally adjusted upward until Amax is in the target range. Several iterations may be necessary.

If, at block 910, Amax is within the target range, the 'Y' branch is taken, and peaking coefficient of CTLE 503, as input to DAC 516, is adjusted (block 912). The CTLE is a linear amplifier which provides adjustable poles and zeroes creating an emphasized high-frequency response (peaking) to compensate for lossy transmission mediums. When the amplifier's response is optimally compensating for the channel losses, the jitter from inter-symbol interference (ISI) is minimized. The peaking amplitude coefficient is trained using a "zero-force-edge" algorithm, as described below. By adding peaking, edges move earlier in time. By decreasing peaking, edges move later in time. Of course, too much peaking can lead to signal distortions and sampling problems, so it is important to find the optimum peaking level. The peaking coefficient is provided to DAC 516 to generate an analog input to CTLE 503.

To calibrate the CTLE peaking coefficient, successive bits of the PRBS23 test pattern are exclusive-ORed to locate data transitions (edges). The transition bit is considered the "h0" bit, the bit immediately before a transition is considered the "h1" bit, and the bit immediately before that is considered the "h2" bit used for correlation. For CTLE calibration, both the "A" vector and the "H1" vector inputs to the sampling latch comparators 504 are zeroed (leaving only the "O" vector components). The phase rotator is adjusted to set the sampling edge of the clock at the known average edge position of the data, the edge position being identified by advancing the clock position until a sufficient proportion of errors appears in the sensed edge samples, an error being defined as an edge sample which is different from the corresponding h0 bit in the known PRBS pattern. With the local sampling clock so adjusted, the erroneously sensed edge samples are correlated to their corresponding h2 bits in the PRBS23 pattern. Since the PRBS23 pattern is pseudo-random, ideally half of the h2 bits are the same as the corresponding h0 bit in the PRBS23 pattern, and half are different.

A preponderance in the error samples of h2 bits which are the same as the h0 bit (the h1 bit necessarily being different from both h2 and h0) indicates over-switching on the h2-to-h1 transition, causing the h1-to-h0 transition to arrive late (i.e. excessive peaking). A preponderance in the error samples of h2 bits which are different from their corresponding h0 bit (the h1 bit being the same as the h2) indicates that the h1-to-h0 transition occurs too slowly, i.e. insufficient peaking. Accordingly, the peaking coefficient is decremented if the h2 and h0 bits mismatch, and incremented if they match, until convergence is achieved.

If a DFE flag is not set (not set being the DFE flag's initial value), the 'N' branch is taken from block 913, the DFE flag is set (block 914), and the calibration process returns to block 907 to remeasure Ap, An and Amin. In this new iteration, since the DFE flag is now set, the "H1" coefficient will be determined. The "H1" coefficient represents approximately half the difference between an average voltage level at the sampling latch input (Ap or An) where the sampled bit was a transition (the "h1" bit was different from the "h0" bit) and an average voltage level where the sampled bit was not a transition (the "h1" bit was the same as the "h0" bit), as graphically depicted in FIG. 10. During operation (i.e., receiving functional data), the "H1" value is added to the voltage thresholds of the sampling latches which are selected following a '1' value of the "h1" bit, and subtracted from the voltage thresholds of the sampling latches which are selected following a '0' value of the "h1" bit.

The "H1" coefficient is trained by measuring the average '1' and '0' amplitudes of the input signal (Ap and An, respectively), correlating discrete measurement errors with the previous bit value, then adjusting the H1 amplitude as needed to minimize the discrete error amplitude. This is performed as follows: For each sampling path, a sufficiently large data sample is obtained while varying the "A" coefficient, as described previously. Ap and An are determined for a given path, as previously described, as the A value at which half the logical '1' or half the logical '0's, respectively, are detected as errors. For the paths through latches 505A and 505C (used to detect even or odd bits, respectively, where the immediately preceding bit in the PRBS23 pattern was logic '1') a respective positive H1 coefficient (+H1) is determined; for the paths through latches 505B and 505D (where the immediately preceding bit was logic '0'), a respective negative H1 coefficient (−H1) is determined. The H1 coefficient is determined by considering only "qualifying" samples, i.e., where the immediately preceding bit was logic '1' for latches 505A, 505C, or logic '0' for latches 505B, 505D, and determining a value of Ap+H1 (for samples in which the PRBS bit is logic '1'), and An+H1 (for samples in which the PRBS bit is logic '0'), at which half of the qualifying samples are detected as errors. There is no separate H1 input to DAC 510, but since Ap and An (as well as the "O" coefficient) are previously determined, these can be algebraically removed to determine H1. For each measurement, numerous readings must be taken and averaged to filter noise.

If, at block 913, the DFE flag is already set, then the calibration routine has already calibrated the "H1" coefficient, and the 'Y' branch is taken from block 913. A further adjustment of the phase rotator is then performed, referred to as the H1/An alignment (block 915). Although the phase rotator was previously adjusted, the effect of the various calibration actions taken in blocks 907-914 is to increase the size of the eye 1001, and in particular to shift the leading edge of the eye earlier in time. This has the effect of changing the center of the eye, which is of course the desired instant in time for the sampling edge of the clock. This phase shift is approximately proportional to H1/An, and therefore H1/An multiplied by a suitable constant yields an approximation of the desired phase rotator adjustment. The phase rotator is accordingly adjusted by this amount at block 915. Although not as accurate as aligning the clock by searching for the edges of the eye (as performed in block 917, described below), using this approximation provides a more rapid phase rotator adjustment.

Convergence of the H1 coefficient is then tested (block 916). The calibration logic saves the value of the H1 coefficient each time convergence is tested at block 916, and compares the current H1 coefficient to that saved at the last convergence test. If the difference between the two is more than a predetermined value, the H1 coefficient has not converged, the 'N' branch is take from block 916, and calibration returns to block 907 to remeasure Ap, An, and Amin and determine H1. A difference of H1 coefficients less than the predetermined value indicates convergence. A limit will be placed on the number of iterations in the absence of convergence to avoid excessively long calibration routines.

If the H1 coefficient has converged, the 'Y' branch is taken from block 916, and an additional (fine) adjustment of the phase rotator is performed to center the clock in middle of the data "eye" (block 917). This is known as "dynamic data centering" (DDC). The DDC function uses the phase rotator and sampling path to perform an eye scan to locate the left and right edges of the eye. It then computes the center position at which to place the sampling clock to achieve optimal placement within the received data eye.

Eye scans are performed while receiving the PRBS23 pattern and comparing it against a pre-synchronized local copy of the pattern. By comparing sampled data against the reference pattern and adjusting the clock phase position, regions of matches and mismatches are mapped. Such mismatches indicate that the current clock position is on the edge of the eye. Since the objective of DDC is to adjust the data sampling point to the center of the eye, it is important to maintain symmetry and balance between the left and right scan operations to avoid introducing artificial offsets in the computed center position. This is achieved by starting the left and right scans from the nominal center position, then slowly integrating the scan position of each side, based on error-free intervals of the same confidence level.

The DDC function starts in a low confidence mode (1 error per 1000 samples, for example) to quickly locate the left and right edges of the eye. The center of the eye is defined as the midpoint between the left and right hand edges defined by the low confidence criteria. Once bit errors at this low confidence level are observed on both scan edges, the confidence level is increased (to 1 per 1,000,000, for example) to improve the accuracy. Following this change, the process is repeated. The left/right positions are scanned and typically move closer to the center since the eye is not as wide with the higher confidence level. Advancement of the scan position requires a full sample interval (defined by the confidence level) to be error free, while detection of errors will cause the scan position to retreat towards center, shifting the scan position. The 1/1000 and 1/1,000,000 bit error rate criteria are examples, and these rates could vary. The phase rotator is then set to the finally calibrated center position.

Completion of DDC alignment completes the calibration of a single line. This process is repeated for each line of the link. It will be noted that, for initial calibration at power-on, blocks 901-903 are first performed for all lines in order to align the FIFO deskew buffer outputs at block 904. After that, the remaining blocks are preferably performed one line at a time, although the order of operations could alternatively be interleaved among multiple lines. For dynamic calibration, it is preferred to calibrate one line at a time, because other lines are being used to transmit functional data.

The above description of a calibration procedure is intended to explain an exemplary calibration procedure for use with the circuit elements described herein as a preferred embodiment. A significant feature of the calibration procedure of the preferred embodiment is that all data input to the calibration circuit is data that has passed through the receiver synchronization circuit and is output by it. No special analog sensing circuitry is required for providing input to the calibration circuit. However, the calibration procedure described herein is not necessarily the only method by which a receiver interface could be calibrated using only the output data or could be calibrated consistent with the present invention. As previously explained, different circuit elements may be present in a receiver synchronization circuit, which may require different calibration procedures as appropriate. Furthermore, even for the circuit elements of the preferred embodiment, the calibration procedures described herein and the parameters used are not necessarily the exclusive means of calibrating the disclosed circuit elements.

It is worth noting that the receiver circuitry and techniques for calibrating a receiver circuit described herein as a preferred embodiment enable a feedback-based calibration of the receiver using only the receiver circuit digital logic output in the host clock domain. As a result, the receiver calibration circuit 309 itself, as well as switches 306 for selectively enabling outputs of receiver circuits, are implemented entirely in digital logic in a low power clock domain, i.e., they do not contain any analog devices. A receiver circuit so implemented offers significant power reduction.

Spare Lane Signaling Protocol

As explained previously, the switching of different lines for dynamic calibration or transmitting functional data involves coordination of the two devices at opposite ends of the link. Preferably, control information for coordinating these activities is exchanged on the same redundant lines which are also used for dynamic calibration. This is accomplished by time multiplexing between performing calibration activities and exchanging control information using a protocol called "Spare Lane Signaling" (SLS). In the SLS protocol described herein, the dynamic calibration process is also referred to as "recalibration", since a line being dynamically calibrated has already undergone at least one calibration (at power-on reset), as well as possibly multiple previous iterations of dynamic calibration. These procedures are described in greater detail below, with reference to FIGS. 11-12.

Control information is transmitted on a single line by repeating an SLS command until some event occurs, such as a timeout or an acknowledgment is received from the intended recipient device. Each SLS command contains 8 consecutive serially transmitted bits ("beats") of the line, which are aligned on a half-byte boundary. The SLS command has the format '1' c0 c1 c2 '0' c3 c4 c5, where the '1' in the first beat distinguishes the first four beats of the SLS command from the second four. Thus, six bits are available for transmitting command data, allowing 64 possible different command types. Although several different command types are discussed herein, it will be appreciated that different and/or additional command types could be employed, e.g., to convey more detailed status information, to recover from errors, etc. Although referred to as an "SLS command", it is not necessarily a command to take some action, and may include any type of control information, including an acknowledgment, status information, or simply a null operation. (No-op).

Data on the line selected for calibration is fed into calibration logic and control circuit 309 after processing through the corresponding receiver synchronization circuit 304, where it is captured in static pattern detector 407. Static pattern detector 407 will detect that a received SLS command has been repeated some minimum number of times, triggering a response in the receiver after the minimum number is met. Since the 8-bit SLS command is simply repeated on the line during a time interval, prior signaling or close coupling of the transmitter and receiver are unnecessary, as long as the receiver will look at the SLS command some time in the corresponding interval that it is being transmitted. The protocol allows the spare lane which is used for calibration to also support low bandwidth exchange of control information, without the need for additional control lines.

Figure 11A:
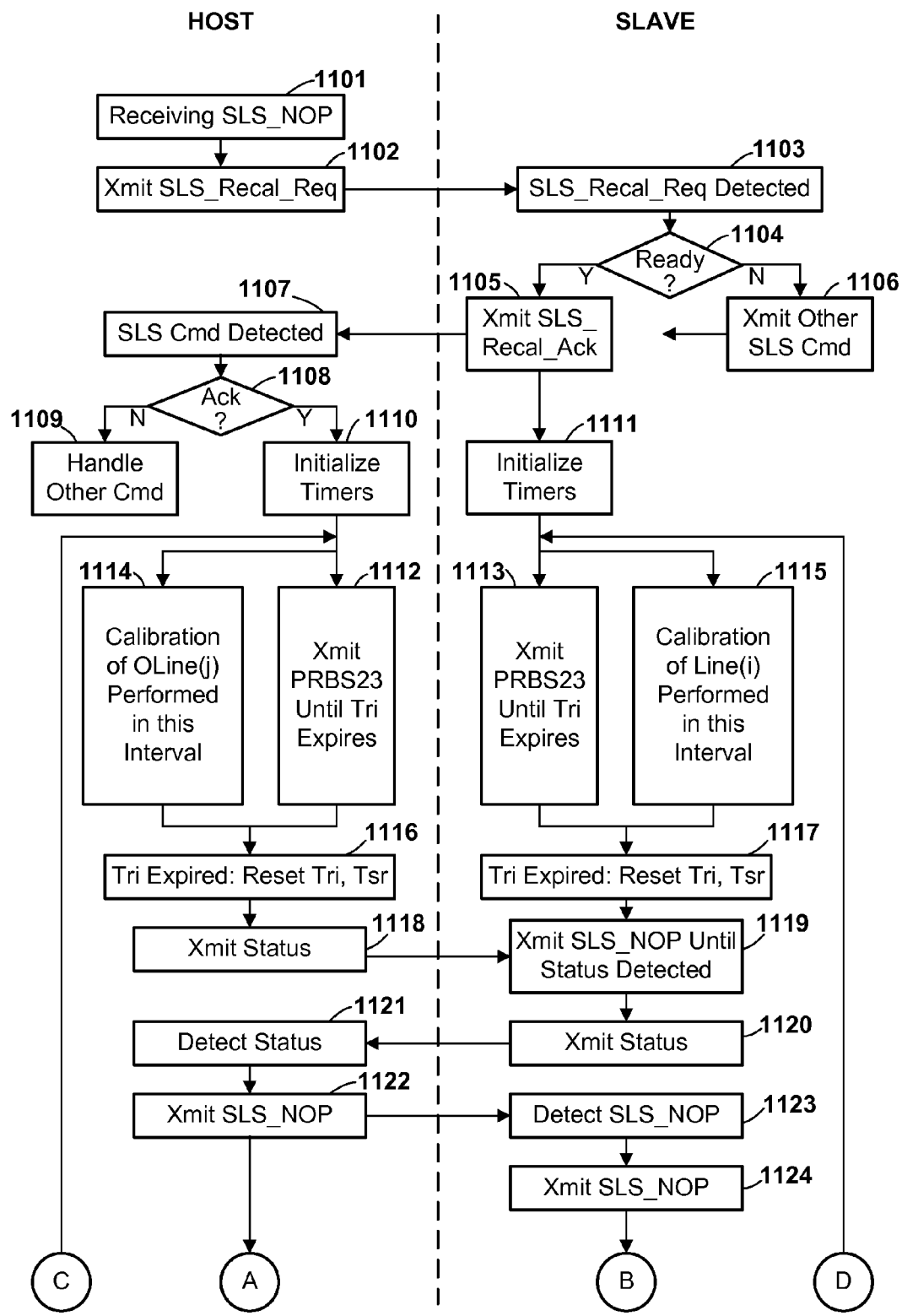
FIGS. 11A and 11B (herein collectively referred to as FIG. 11) are a flow diagram showing a process of exchanging control information and time multiplexing of function for dynamically calibrating a pair of lines of a parallel link, according to the preferred embodiment.
Figure 11B:
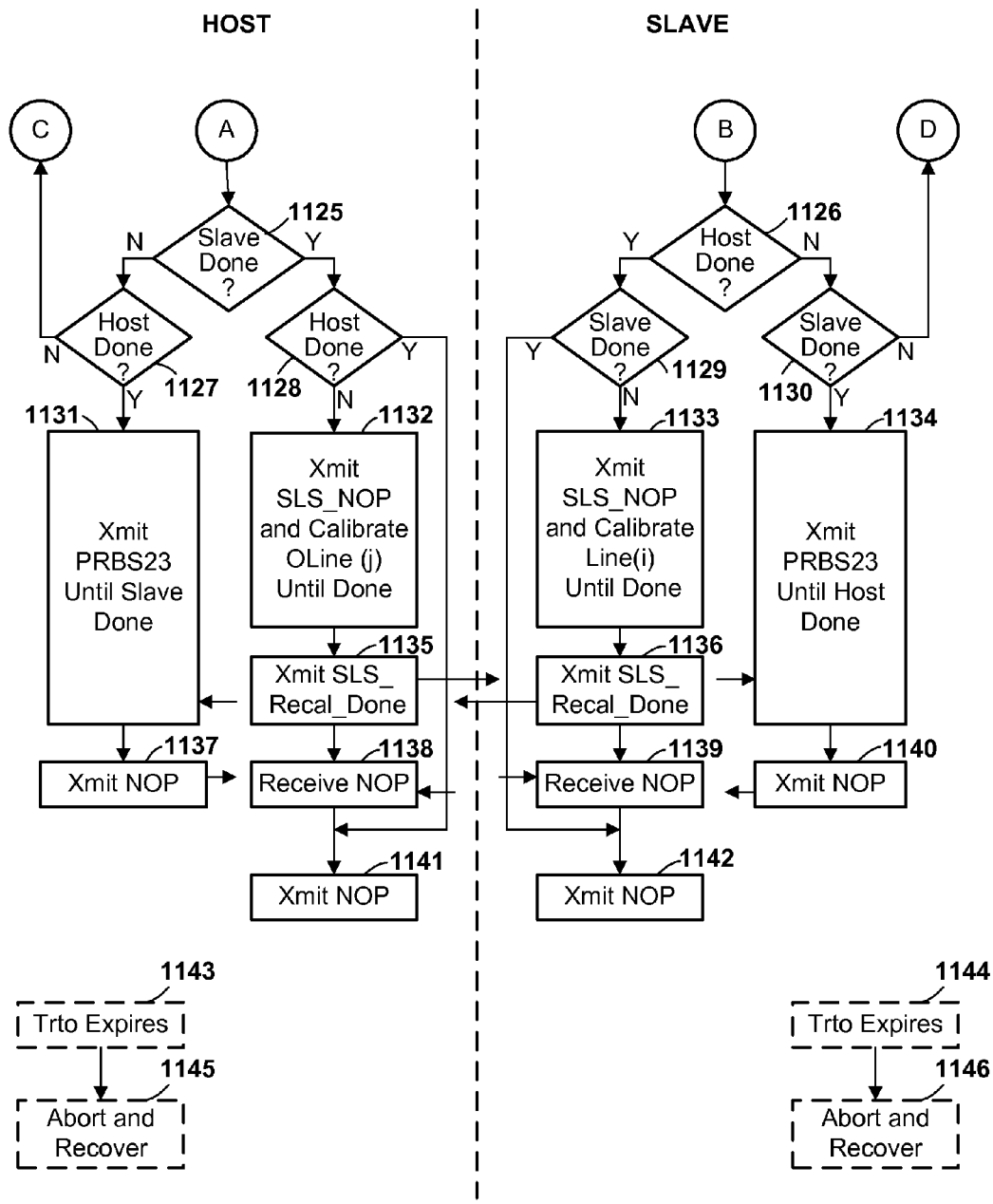

FIGS. 11A and 11B (herein collectively referred to as FIG. 11) are a flow diagram showing a process of exchanging control information and time multiplexing of function for dynamically calibrating a pair of lines of a parallel link, the two lines of the pair conveying data in opposite directions, according to the preferred embodiment. I.e., FIG. 11 illustrates in greater detail the exchange of control information and time multiplexing of function involved in performing block 802 of FIG. 8.

Referring to FIG. 11, one of the two devices coupled by the link is arbitrarily designated the "host", while the other is designated the "slave". Actions performed by the host are illustrated on the left side of the central division line in FIG. 11, while actions performed by the slave are illustrated on the right side. At the beginning of calibration, the redundant line from the host to the slave is Line(i), while the redundant line from the slave to the host is OLine(j), i.e., these are the next lines to be calibrated, while the other lines are transmitting functional data. The host has finished any switching of previously calibrated lines (blocks 805 and 806 of FIG. 8), and is in a quiescent state. In this state, the host is repeatedly transmitting an SLS no-operation (SLS_NOP) command on Line (i) to the slave, and is receiving an SLS_NOP command on OLine(j) from the slave, indicating that the slave is probably finished with any line switching and ready to calibrate (block 1101).

The host then initiates the calibration by repeatedly sending an SLS recalibration request (SLS_Recal_Req) to the slave on Line(i) (block 1102). The SLS recal request is detected by a static pattern detector in the calibration circuit (block 1103). If the slave is ready to begin calibration (the 'Y' branch from block 1104), it stops transmitting SLS_NOP, and repeatedly transmits an SLS recalibration acknowledgment (SLS_Recal_Ack) to the host on OLine(j) (block 1105). If the slave is not ready to begin calibration (the 'N' branch from block 1104), it stops transmitting SLS_NOP and repeatedly transmits an alternative SLS command on OLine(j) (block 1106). For example, if the slave is still performing switching of lines (as shown in blocks 805-806 or blocks 807-810 of FIG. 8), the slave would transmit an appropriate next command in the sequence of switching lines.

The host receives the SLS_Recal_Ack or alternative command from the slave on OLine(j) (block 1107). If the command is anything other than an SLS_Recal_Ack (the 'N' branch from block 1108), the host stops transmitting SLS_Recal_Req, and responds as appropriate to the alternative command (block 1109). If the command received from the slave is an SLS_Recal_Ack (the 'Y' branch from block 1108), the host initializes a set of timers (block 1110). At approximately the same time, the slave initializes a corresponding set of timers (block 1111).

Calibration and time multiplexing of SLS commands is preferably governed by three timers, which could use selectable values. A recalibration timeout (Trto), usually in the multiple-millisecond range, is used to abort calibration if one or both lanes fail to properly calibrate in a reasonable time. A recalibration interval (Tri), usually in the multiple-microsecond range, is used to define the length of time for sending the PRBS23 bit pattern and performing calibration operations at the receiver. A status reporting interval, Tsr, usually in the sub-microsecond range, is used to define which portion of the recalibration interval is used to send and receive status via SLS commands. The timers in the host and slave are not necessarily synchronized to begin at precisely the same moment, but the nature of the SLS protocol accommodates small discrepancies in the timers which inevitably result from the time required to propagate and detect the SLS command.

Upon initializing the Trto and Tri timers at blocks 1110, 1111, the host repeatedly transmits the PRBS23 test pattern on Line(i) (block 1112), and the slave repeatedly transmits the PRBS23 test pattern on OLine(j) (block 1113), until the expiration of the Tri timers in the host and slave. During this interval, both the host and the slave perform calibration actions as described above and illustrated in FIG. 9 with respect to the receiver synchronization circuit for OLine(j) and the receiver synchronization circuit for Line(i), respectively (blocks 1114 and 1115).

Upon expiration of the Tri timers, calibration actions are suspended in the host and the slave. The Tri and Tsr timers are reset in both the host (block 1116) and the slave (block 1117). The host then repeatedly transmits its status (as an appropriate SLS command) to the slave on Line(i) (block 1118), while the slave initially transmits SLS NOP to the host on OLine(j) until the host's status is detected (block 1119). When the slave detects the host's status on Line(i), it then stops transmitting SLS NOP, and repeatedly transmits its own status on OLine(j) (block 1120). The host, upon detecting the slave's status on OLine(j) (block 1121), takes this as an acknowledgment from the slave that the slave has successfully detected the host's status, and responds by transmitting SLS NOP on Line(i) (block 1122). The slave, upon detecting SLS NOP from the host (block 1123), stops transmitting status and transmits SLS NOP on OLine(j) (block 1124). The host and slave continue to transmit SLS NOP on their respective lines until the respective Tsr timers expire. Because recalibration is not necessarily complete, in order to properly receive status data, the calibrated coefficients of the receiver synchronization circuits are restored to their respective states before dynamic recalibration was commenced while receiving during the Tsr interval.

Upon expiration of the Tsr timers, both the host and slave should have each other's current state. (In the unlikely event the Tsr timers expire before the host or slave detects the other's status, the device which did not detect status simply assumes that the other has not finished calibration, and proceeds accordingly.) If neither the host nor the slave has finished recalibration (the 'N' branches from blocks 1125 and 1127, and the 'N' branches from blocks 1126 and 1130), then the host and slave return to blocks 1112, 1114 and 1113, 1115, respectively to again transmit the PRBS23 test pattern on Line(i) and OLine(j), respectively, and resume calibration of the receiver synchronization circuits in OLine(j) and Line(i), respectively, until Tri again expires.

If the host has finished recalibration of the receiver synchronization circuit for OLine(j) but the slave has not finished recalibration of the receiver synchronization circuit for Line (i) (the 'N' branch from block 1125 and 'Y' branch from block 1127 in the host, and the 'Y' branch from block 1126 and the 'N' branch from block 1129 in the slave), then the host transmits the PRBS23 pattern on Line(i) while listening for status on OLine(j) (block 1131). The slave meanwhile transmits SLS NOP on OLine(j) while continuing to calibrate the receiver synchronization circuit for Line(i) (block 1133). When the slave finishes recalibration of Line(i), it transmits an appropriate SLS_Recal_Done status command OLine(j)

(block 1136). The host, upon detecting the status command, ceases transmitting PRBS23, and transmits SLS NOP on Line(i) (block 1137). The slave, upon detecting SLS NOP on Line(i) (block 1134), ceases transmitting status and transmits SLS NOP on OLine(j) (block 1142)

An analogous procedure is followed if the slave has finished recalibration of the receiver synchronization circuit for Line(i) but the host has not finished recalibration of the receiver synchronization circuit for OLine(j) (the 'Y' branch from block 1125 and 'N' branch from block 1128 in the host, and the 'N' branch from block 1126 and the 'Y' branch from block 1130 in the slave). The slave transmits the PRBS23 pattern on OLine(j) while listening for status on Line(i) (block 1134). The host meanwhile transmits SLS NOP on Line(i) while continuing to calibrate the receiver synchronization circuit for OLine(j) (block 1132). When the host finishes recalibration of OLine(j), it transmits an appropriate SLS_Recal_Done command on Line(i) (block 1135). The slave, upon detecting the status command, ceases transmitting PRBS23, and transmits SLS NOP on OLine(i) (block 1140). The host, upon detecting SLS NOP on OLine(j) (block 1133), ceases transmitting status and transmits SLS NOP on Lline(i) (block 1141).

If both the host and the slave have finished recalibration of their respective receiver synchronization circuits (the 'Y' branches from blocks 1125 and 1128 in the host, and the 'Y' branches from blocks 1126 and 1129 in the slave), then the host and slave transmit SLS_NOP on Line(i) and OLine(j), respectively (blocks 1141, 1142)

Throughout the performance of blocks 1112 through 1139, the Trto timers are running in the host and slave devices. If these timers timeout (represented as blocks 1143, 1144), further calibration processing is immediately aborted, and appropriate recovery actions are taken (represented as blocks 1145, 1146). The Trto timers thus prevent calibration from continuing indefinitely, where more than adequate time for performing calibration has already elapsed. The recovery actions would depend on the circumstances. For example, where a single line can not be calibrated, it may be possible to power down that line and power up a spare line (e.g. Line (N+2)) to provide a replacement. Some problems may require suspension of functional data transmission and/or re-initialization of the entire link, but it is expected that this will only rarely occur.

Figure 12:
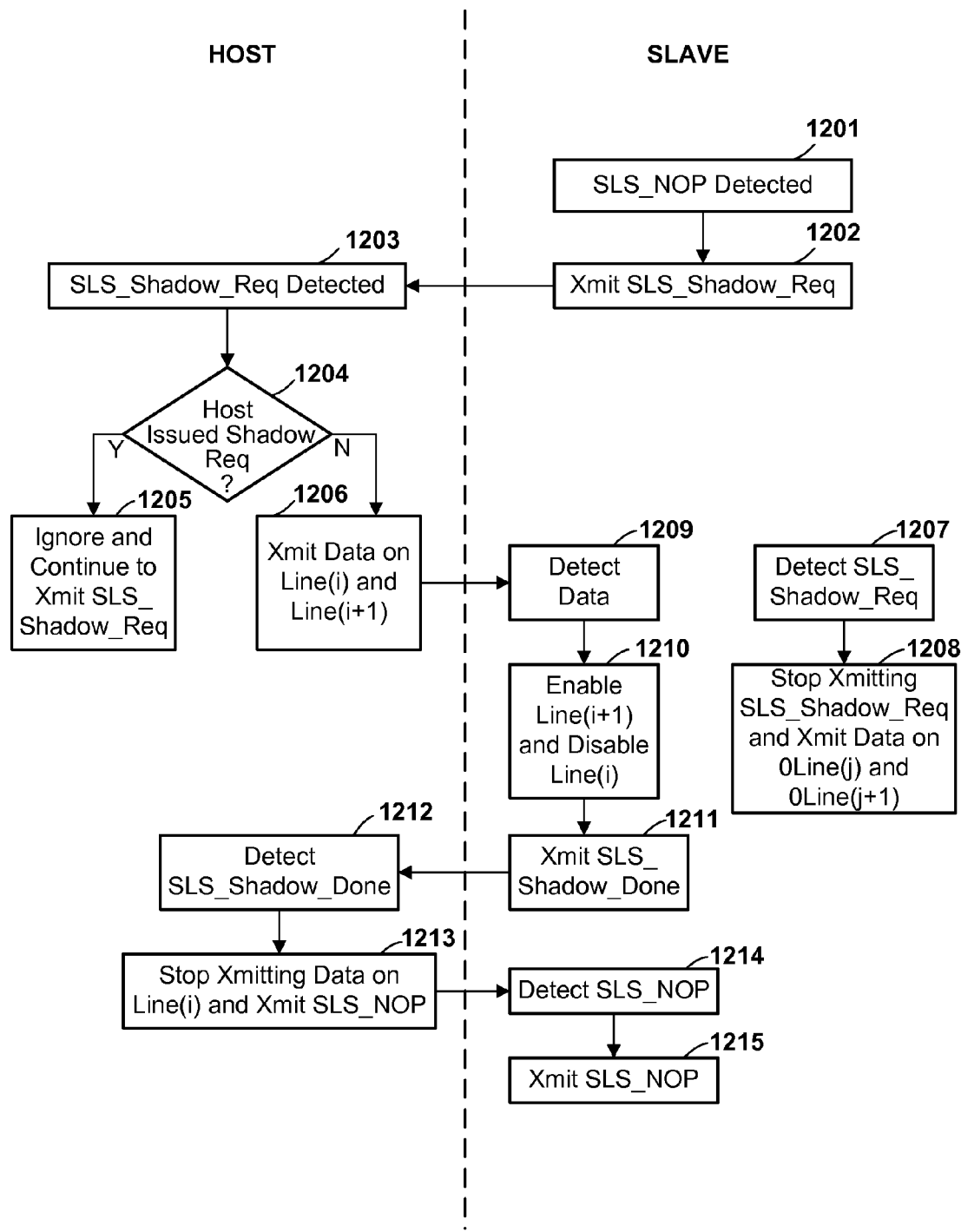
FIG. 12 is a flow diagram showing a process of exchanging control information and switching functional data from a line to be calibrated to a recently calibrated line, according to the preferred embodiment.

FIG. 12 is a flow diagram showing a process of exchanging control information and switching functional data from a Line(i) to a Line(i+1), immediately after calibrating Line(i+1), according to the preferred embodiment. I.e., FIG. 12 illustrates in greater detail the exchange of control information involved in performing blocks 805-806 of FIG. 8, a process referred to as "shadowing". FIG. 12 shows the process of switching lines calibrated by the slave; the switching of lines calibrated by the host is similar, with some differences noted below. Switching of the lines in the opposite direction, after all lines have been calibrated (i.e. blocks 808-809 of FIG. 8) is referred to as "unshadowing".

Referring to FIG. 12, actions performed by the host are illustrated on the left side of the central division line in FIG. 12, while actions performed by the slave are illustrated on the right side. At the beginning of calibration, the redundant line from the host to the slave is Line(i+1), Line(i) having just been calibrated. The slave is in a quiescent state, and is receiving SLS_NOP on the redundant Line(i+1) (block 1201)

The slave initiates the process by repeatedly transmitting an SLS shadow request (SLS_Shadow_Req) on the current redundant OLine (block 1202). The host detects the SLS_Shadow_Req (block 1203). If the host has already issued its own shadow request (or unshadow request) to the slave (the 'Y' branch from block 1204), the host will continue to transmit SLS_Shadow_Req (or SLS_Unshadow_Req, as the case may be) on Line(i) and ignore the slave's shadow/unshadow request, waiting for the slave to acknowledge the host's request (block 1205). If the host has not issued a shadow or unshadow request (the 'N' branch from block 1204), the host begins transmitting functional data on Line (i+1) as it continues to transmit identical functional data on Line(i) (block 1206).

After issuing the SLS_Shadow_Req, the slave listens on Line(i+1) for something other than SLS_NOP. If the slave detects an SLS_Shadow_Req from the host (block 1207), the slave stops transmitting its own SLS_Shadow_Req, and begins transmitting identical copies of functional data on OLine(j) and OLine(j+1) (block 1208). I.e., the slave defers to the host, allowing the host's request to proceed. If the slave instead detects functional data on Line(i+1) (block 1209), the slave operates the appropriate switches 306 to enable output from Line(i+1) and disable output from Line(i) (block 1210). It will be observed that, prior to switching, both Line(i) and Line(i+1) are receiving identical data and that the data output from the respective receiver synchronization circuits associated with Line(i) and Line(i+1) are synchronized on the same clock with respect to each other. Therefore switching from Line(i) to Line(i+1) is not visible to downstream functional logic within the slave device.

After switching lines, the slave transmits SLS_shadow_done to the host on the redundant OLine (block 1211). The host detects SLS_shadow_done (block 1212). The host then stops transmitting functional data on Line(i), and begins transmitting SLS_NOP on Line(i), indicating that Line(i) is now to be used as the redundant line for SLS commands and calibration (block 1213). The slave detects SLS_NOP on Line(i) (block 1214), and responds by discontinuing SLS_Shadow_Done on the redundant OLine, and instead transmitting SLS_NOP on the redundant OLine (block 1215).

Either the host or the slave may issue an SLS_Shadow_Req, and in any order. However, the two requests can not be performed concurrently, because the handshaking protocol requires that redundant lines be available in both directions for handling a single request. One device will perform shadowing (or unshadowing) of its receivers, and the other device will then perform shadowing (or unshadowing). To address the possibility that both host and slave will simultaneously issue the SLS_Shadow_Req, the host's request is given priority. Therefore, a request issued by the host mirrors the procedure shown in FIG. 12 with sides reversed, except that blocks 1204, 1205, 1207, and 1208 are unnecessary. I.e., blocks 1204 and 1205 are unnecessary because the host's shadow request will assume priority, so if the slave detects a request from the host as at block 1203, it will simply transmit identical copies of the data on the two lines as at block 1206, whether or not it has also issued an SLS_Shadow_Req. In this case, transmitting identical copies of the data has the effect of cancelling any SLS_Shadow_Req from the slave, since the redundant line (which was being used to transmit the slave's request) is now being used to transmit a second copy of functional data. Similarly, blocks 1207 an 1208 are unnecessary in the host, because the host ignores any request from the slave if it has issued its own request.

An analogous procedure is followed to switch functional data from Line(i+1) to Line(i) when returning the lines to their initial state after all lines have been calibrated, i.e., when performing step 808-809 of FIG. 8, a process known as "unshadowing". In this case, the redundant line is initially Line(i). An SLS unshadow request (SLS_Unshadow_Req) is issued at block 1202 instead of the SLS_Shadow_Req. The unshadow request tells the receiving device that lines will be switched in a direction opposite to that of the shadowing request. The receiving device responds by transmitting a copy of functional data on Line(i) which is the same as the currently transmitted functional data on Line(i+1), as at block 1206. The requesting device follows by enabling Line(i) and disabling Line(i+1), as at block 1210.

Other Variations

In the preferred embodiment described above, the line being used for calibration is shifted one at a time, up and down the bus. It would alternatively be possible to provide a single dedicated line for calibration, and to shift functional data from each functional line to the dedicated line while the functional line is being calibrated. While there may be some advantages to this approach, this would require a large multiplexor in the transmitter to allow any line's functional data to be sent on the dedicated calibration line, which could involve critical timing and wiring problems, and the approach described herein is therefore believed to be preferable for most applications.

In the preferred embodiment described above, all calibration adjustments, and particularly the adjustment of the local clock phase, are performed within the receiver synchronization circuit. Adjusting the receiver circuitry to accommodate variations in the individual lines is preferred, because calibration logic which analyzes the outputs of the receiver synchronization circuits is located in the same device. However, it will be appreciated that variations in the parameters of individual lines and their associated circuits could alternatively be compensated in whole or in part by adjustments performed in the transmitter circuits. In particular, it would be possible to individually adjust a local clock for each transmitter circuit so that the outputs produced by the receiver synchronization circuits are in a common clock domain. It is possible that other parameters, such as a variable gain or an offset, might also be adjusted within the transmitter.

In the preferred embodiment described above, a bidirectional parallel data link contains separate unidirectional portions each having at least one redundant line, and the redundant lines are used to transmit control signals during calibration as described herein. This approach has the advantage of utilizing the existing redundant lines for exchanging control information, obviating the need for additional control lines for that purpose. However, it would alternatively be possible to provide control information for purposes of coordinating calibration by other means, in particular by use of one or more additional control lines, or by interrupting functional data to transmit control information on the functional data lines. Additionally, while it is preferred that a point-to-point link be bidirectional, the link could alternatively be unidirectional, i.e. a unidirectional set of lines 301 as shown in FIG. 3 could exist independently, without any lines for transmitting data in the opposite direction. In this case, there should be alternative means for transmitting control signals in the opposite direction for purposes of coordinating calibration actions described above.

Although a specific embodiment of the invention has been disclosed along with certain alternatives, it will be recognized by those skilled in the art that additional variations in form and detail may be made within the scope of the following claims.

What is claimed is:

1. A communications interface for a digital data device, comprising:
   (N+M) ports, each for receiving a respective serial data signal over a respective communications line;
   a clock circuit which produces (N+M) phase adjusted local clock signals, each phase adjusted local clock signal corresponding to a respective port of said (N+M) ports, each phase adjusted local clock signal being phase offset from an interface clock signal, the phase offset of each phase adjusted local clock signal being independently adjustable;
   (N+M) receiver/deserializer circuits each corresponding to a respective port of said (N+M) ports and for receiving the respective serial data signal from the corresponding port and producing a respective deserialized output, each receiver/deserializer circuit comprising at least one latch which captures data received on the corresponding port responsive to the corresponding phase adjusted local clock signal;
   (N+M) alignment circuits, each alignment circuit corresponding to a respective receiver/deserializer circuit and for producing respective aligned data from the deserialized output of the corresponding receiver/deserializer circuit, said aligned data being synchronized to a common clock signal;
   N switches, each switch receiving input derived from aligned data produced by a respective subset of said (N+M) alignment circuits, each subset comprising more than one and fewer than all of said (N+M) alignment circuits, and selecting the input derived from aligned data produced by a respective one of the alignment circuits of the respective subset of said (N+M) alignment circuits as output of the respective switch for use by said digital device, wherein N is greater than one, and wherein M is at least one; and
   a calibration mechanism controlling said switches and operative responsive to said common clock signal, said calibration mechanism receiving data derived from outputs of said alignment circuits to calibrate the phase offset of each said phase adjusted local clock signal.

2. The communications interface of claim 1, wherein each said alignment circuit produces the respective aligned data on a respective p parallel bit lines.

3. The communications interface of claim 1, further comprising (N+M) data transformation circuits for ensuring transition density of transmitted data, each data transformation circuit corresponding to a respective alignment circuit and receiving as input data derived from aligned data produced by the corresponding alignment circuit and producing transformed data as output; wherein said switches receive transformed data produced by said data transformation circuits.

4. The communications interface of claim 1, wherein M=1 and each switch receives input derived from alignment data produced by a respective pair of said (N+M) alignment circuits.

5. The communications interface of claim 1, wherein each said receiver/deserializer circuit comprises a respective receiver amplifier which performs at least one of (a) amplifying an incoming data signal on the corresponding line, and (b) providing a voltage offset to an incoming data signal on the corresponding line, each said receiver amplifier having at least one respective variable parameter established by said calibration mechanism.

6. The communications interface of claim 1,
wherein output of a first alignment circuit corresponding to a first receiver/deserializer circuit being calibrated is prevented from being used as functional data during at least one calibration operation while outputs of N of said receiver synchronization circuits not being calibrated are enabled for providing functional data by said switches.

7. The communications interface of claim 1,
wherein each receiver/deserializer circuit of said (N+M) receiver/deserializer circuits comprises a plurality of latches which capture data received on the corresponding port responsive to the corresponding phase adjusted local clock signal, including at least one first latch for capturing data when there has been a transition of a data bit transmitted on the corresponding port with respect to a previous data bit transmitted on the corresponding port and at least one second latch for capturing data when there has been no transition of the data bit on the corresponding port with respect to the previous data bit transmitted on the corresponding port, said at least one first latch and said at least one second latch being responsive to separately calibratable voltage offsets to an input signal voltage, said separately calibratable voltage offsets being calibrated by said calibration mechanism.

8. The communications interface of claim 3,
wherein said calibration circuit receives outputs produced by said data transformation circuits to calibrate said receiver/deserializer circuits.

9. A communications interface for a digital data device, comprising:
(N+M) ports, each for receiving a respective serial data signal over a respective communications line;
a clock circuit which produces (N+M) phase adjusted local clock signals, each phase adjusted local clock signal corresponding to a respective port of said (N+M) ports, each phase adjusted local clock signal being phase offset from an interface clock signal, the phase offset of each phase adjusted local clock signal being independently adjustable;
(N+M) receiver synchronization circuits each corresponding to a respective port of said (N+M) ports, each receiver synchronization circuit receiving a respective communications signal from the corresponding port of said (N+M) ports and producing a respective synchronization circuit output, each said receiver synchronization circuit comprising at least one latch which captures data received on the corresponding port responsive to the corresponding phase adjusted local clock signal, each said synchronization circuit output being synchronized to a common clock domain of said digital data device, wherein M of said receiver synchronization circuits are redundant, wherein N is greater than one and wherein M is at least one;
a switching mechanism operating in said common clock domain for selectively enabling and disabling selective outputs of said receiver synchronization circuits;
a calibration mechanism operating in said common clock domain and controlling said switching mechanism, said calibration mechanism receiving data derived from outputs of said synchronization circuits to calibrate said receiver synchronization circuits by calibrating the phase offset of each said phase adjusted local clock signal, wherein during at least one calibration operation with respect to each said receiver synchronization circuit, output of a first synchronization circuit being calibrated is disabled by said switching mechanism.

10. The communications interface of claim 9,
wherein each said receiver synchronization circuit produces the respective aligned data on a respective p parallel bit lines.

11. The communications interface of claim 9, wherein each said receiver synchronization circuit comprises a respective data transformation device for ensuring transition density of transmitted data, each data transformation device being independently selectively enabled to perform a transformation operation on data communicated over the corresponding communications line or not enabled to perform the transformation operation.

12. The communications interface of claim 9, wherein each said receiver synchronization circuit comprises a respective receiver amplifier which performs at least one of (a) amplifying an incoming data signal on the corresponding line, and (b) providing a voltage offset to an incoming data signal on the corresponding line, each said receiver amplifier having at least one respective variable parameter established by said calibration mechanism.

13. The communications interface of claim 9, wherein each said receiver synchronization circuit comprises a respective plurality of deskewing latches for providing a respective adjustable delay corresponding to a variable number of cycles of said common clock domain, the adjustable delay of each said receiver synchronization circuit being independently calibrated by said calibration mechanism.

14. The communications interface of claim 9, wherein said switching mechanism comprises N switches operating responsive to at least one clock signal of said common clock domain, each switch receiving inputs derived from the output of each receiver synchronization circuit of a respective subset of said (N+M) receiver synchronization circuits and selecting the input derived from a respective one of the synchronization circuits of the respective subset as output of the respective switch for use by said digital data device, each said subset containing at least two and fewer than all of said (N+M) receiver synchronization circuits.

15. The communications interface of claim 9,
wherein each receiver synchronization circuit of said (N+M) receiver synchronization circuits comprises a plurality of latches which capture data received on the corresponding port responsive to the corresponding phase adjusted local clock signal, including at least one first latch for capturing data when there has been a transition of a data bit transmitted on the corresponding port with respect to a previous data bit transmitted on the corresponding port and at least one second latch for capturing data when there has been no transition of the data bit on the corresponding port with respect to the previous data bit transmitted on the corresponding port, said at least one first latch and said at least one second latch being responsive to separately calibratable voltage offsets to an input signal voltage, said separately calibratable voltage offsets being calibrated by said calibration mechanism.

16. A communications interface for a digital data device, comprising:
a plurality of ports, each for receiving a respective serial data signal over a respective communications line, including at least one redundant port and communications line;
a clock circuit which produces a plurality of phase adjusted local clock signals, each phase adjusted local clock signal corresponding to a respective port of said plurality of ports, each phase adjusted local clock signal being phase offset from an interface clock signal, the phase offset of each phase adjusted local clock signal being independently adjustable;

a plurality of receiver synchronization circuits, each receiver synchronization circuit corresponding to and for receiving a respective incoming serial data signal from a respective port of a plurality of ports, each said receiver synchronization circuit capturing incoming data in at least one latch operative responsive to the corresponding phase adjusted local clock signal, each said receiver synchronization circuit having a respective plurality of deskewing latches for providing a respective adjustable delay of an output of the respective plurality of deskewing latches corresponding to a respective variable number of cycles of a clock operating the respective plurality of deskewing latches, the adjustable delay of each said receiver synchronization circuit being independently calibrated, the outputs of said receiver synchronization circuits being synchronized to a common clock domain of said digital data device and aligned with respect to one another by said deskewing latches;

a plurality of switches for enabling and disabling selective outputs of said receiver synchronization circuits, a calibration mechanism controlling said switches, said calibration mechanism receiving data derived from outputs of said receiver synchronization circuits to calibrate said receiver synchronization circuits by calibrating the phase offset of each said phase adjusted local clock signal and by calibrating the adjustable delay of each said respective plurality of deskewing latches, wherein during at least one calibration operation with respect to each said receiver synchronization circuit, output of the receiver synchronization circuit being calibrated is disabled by said plurality of switches.

17. The communications interface of claim 16,
wherein each said receiver synchronization circuit produces the respective aligned data on a respective plurality of parallel bit lines.

18. The communications interface of claim 16, wherein each said receiver synchronization circuit comprises a respective receiver amplifier which performs at least one of (a) amplifying an incoming data signal on the corresponding line, and (b) providing a voltage offset to an incoming data signal on the corresponding line, each said receiver amplifier having at least one respective variable parameter established by said calibration mechanism.

19. The communications interface of claim 16, wherein each said receiver synchronization circuit comprises a respective data transformation device for ensuring transition density of transmitted data, each data transformation device being independently selectively enabled to perform a transformation operation on data communicated over the corresponding communications line or not enabled to perform the transformation operation.

20. A method of calibrating a parallel data link of a digital data device, the parallel data link having a plurality of parallel lines including at least one redundant line, data on each line having a respective independent skew time, each line having a corresponding transmitter circuit in a transmitting device and a corresponding receiver circuit in a receiving device, each receiver circuit using a corresponding phase adjusted local clock signal in said receiving device and providing data output in a common clock domain, the method comprising:

(a) disabling data output in said common clock domain of a first receiver circuit corresponding to a first line of said plurality of parallel lines while enabling data output of receiver circuits other than said first receiver circuit for providing functional data;

(b) using said data output of said first receiver circuit in said common clock domain to calibrate an independent local clock phase adjustment of the corresponding phase adjusted local clock signal corresponding to said first receiver circuit while said first receiver circuit is disabled and while the outputs of receiver circuits other than said first receiver circuit are enabled for providing functional data, the respective phase adjusted local clock signal corresponding to each receiver circuit being used to clock at least one respective latch in the corresponding receiver circuit which captures data received over the corresponding line; and repeating said (a) and (b) for each line of said plurality of parallel lines until each independent local clock phase adjustment of each phase adjusted local clock signal corresponding to each receiver circuit of said plurality of receiver circuits is calibrated.

21. The method of claim 20, wherein said receiver circuit comprises a receiver amplifier which performs at least one of (a) amplifying an incoming data signal on the corresponding line, and (b) providing a voltage offset to an incoming data signal on the corresponding line, said method further comprising:

(c) using said data output of said first receiver circuit in said common clock domain to calibrate at least one variable parameter of said receiver amplifier; and repeating said (c) for each line of said plurality of parallel lines until each receiver amplifier is calibrated.

22. The communications interface of claim 16,
wherein each receiver synchronization circuit of said plurality of receiver synchronization circuits comprises a respective plurality of latches which capture data received on the corresponding port responsive to the corresponding phase adjusted local clock signal, including at least one first latch for capturing data when there has been a transition of a data bit transmitted on the corresponding port with respect to a previous data bit transmitted on the corresponding port and at least one second latch for capturing data when there has been no transition of the data bit on the corresponding port with respect to the previous data bit transmitted on the corresponding port, said at least one first latch and said at least one second latch being responsive to separately calibratable voltage offsets to an input signal voltage, said separately calibratable voltage offsets being calibrated by said calibration mechanism.

\* \* \* \* \*